US008510468B2

(12) United States Patent
Vange et al.

(10) Patent No.: US 8,510,468 B2
(45) Date of Patent: *Aug. 13, 2013

(54) ROUTE AWARE NETWORK LINK ACCELERATION

(75) Inventors: Mark Vange, Scottsdale, AZ (US); Marc Plumb, Toronto (CA); Michael Kouts, Toronto (CA); Glenn Sydney Wilson, Toronto (CA); Roch Guerin, Newtown Square, PA (US); Rajendran Rajan, Philadelphia, PA (US)

(73) Assignee: Ciradence Corporation, Boulder, CO (US)

( * ) Notice: Subject to any disclaimer, the term of this patent is extended or adjusted under 35 U.S.C. 154(b) by 130 days.

This patent is subject to a terminal disclaimer.

(21) Appl. No.: 12/853,467

(22) Filed: Aug. 10, 2010
(Under 37 CFR 1.47)

(65) Prior Publication Data

US 2011/0296051 A1  Dec. 1, 2011

Related U.S. Application Data

(60) Continuation-in-part of application No. 11/346,767, filed on Feb. 3, 2006, now Pat. No. 7,975,066, and a continuation-in-part of application No. 12/423,392, filed on Apr. 14, 2009, now Pat. No. 8,218,447, said application No. 11/346,767 is a division of application No. 09/835,876, filed on Apr. 16, 2001, now Pat. No. 7,127,518, said application No. 12/423,392 is a continuation of application No. 10/895,156, filed on Jul. 20, 2004, now Pat. No. 7,525,920, which is a continuation of application No. 09/997,420, filed on Nov. 29, 2001, now Pat. No. 6,836,465.

(60) Provisional application No. 60/197,490, filed on Apr. 17, 2000.

(51) Int. Cl.
*G06F 15/173* (2006.01)

(52) U.S. Cl.
USPC ............ 709/238; 709/224; 709/245; 370/419

(58) Field of Classification Search
USPC .......................................................... 709/238
See application file for complete search history.

(56) References Cited

U.S. PATENT DOCUMENTS

| 4,939,726 A | 7/1990 | Flammer |
| 5,101,348 A | 3/1992 | Arrowood et al. |

(Continued)

FOREIGN PATENT DOCUMENTS

| EP | 0384339 | 8/1990 |
| EP | 0774878 | 8/1997 |

(Continued)

OTHER PUBLICATIONS

V. Kumar, et al., "Beyond Best Effort: Reouter Architectures for the Differentiated Services of Tomorrow's Internet", May 1998, IEEE Communications Magazine, pp. 152-164.

(Continued)

*Primary Examiner* — Hua Fan
(74) *Attorney, Agent, or Firm* — Weide & Miller, Ltd.

(57) ABSTRACT

A method and apparatus for route aware network link acceleration provides a managed communication channel for accelerated and reliable network communication between a client and other network devices as needed. The communication channel may comprise one or more segments having increased speed, reliability, security, or other improved characteristics as compared to traditional communication links. Network traffic may be routed through one or more of the segments based on various criteria to improve communication of the traffic. In one embodiment, the segments may be arranged in a daisy chain configuration and be provided by one or more chaining nodes.

6 Claims, 22 Drawing Sheets

(56) References Cited

U.S. PATENT DOCUMENTS

| | | |
|---|---|---|
| 5,115,433 A | 5/1992 | Baran et al. |
| 5,130,982 A | 7/1992 | Ash et al. |
| 5,258,983 A | 11/1993 | Lane et al. |
| 5,309,433 A | 5/1994 | Cidon |
| 5,317,566 A | 5/1994 | Joshi |
| 5,323,394 A | 6/1994 | Perlman |
| 5,365,523 A | 11/1994 | Derby et al. |
| 5,398,012 A | 3/1995 | Derby et al. |
| 5,491,690 A | 2/1996 | Alfonsi et al. |
| 5,497,368 A | 3/1996 | Reijnierse et al. |
| 5,548,646 A | 8/1996 | Aziz et al. |
| 5,673,322 A | 9/1997 | Pepe et al. |
| 5,687,168 A | 11/1997 | Iwata |
| 5,742,772 A | 4/1998 | Sreenan |
| 5,754,790 A | 5/1998 | France |
| 5,757,771 A | 5/1998 | Li et al. |
| 5,805,203 A | 9/1998 | Horton |
| 5,930,259 A | 7/1999 | Katsube |
| 5,933,412 A | 8/1999 | Choudhury et al. |
| 5,951,694 A | 9/1999 | Choquier et al. |
| 5,956,330 A | 9/1999 | Kerns |
| 5,999,971 A | 12/1999 | Buckland |
| 6,003,090 A | 12/1999 | Puranki et al. |
| 6,006,264 A | 12/1999 | Colby et al. |
| 6,023,456 A | 2/2000 | Chapman et al. |
| 6,023,501 A | 2/2000 | Wakamatsu |
| 6,034,964 A | 3/2000 | Fukushima et al. |
| 6,070,192 A | 5/2000 | Holt et al. |
| 6,078,582 A | 6/2000 | Curry et al. |
| 6,078,590 A | 6/2000 | Farinacci et al. |
| 6,081,900 A | 6/2000 | Subramaniam et al. |
| 6,097,718 A | 8/2000 | Bion |
| 6,108,710 A | 8/2000 | Brabson et al. |
| 6,119,170 A | 9/2000 | Schoffelman et al. |
| 6,167,449 A | 12/2000 | Arnold et al. |
| 6,205,146 B1 | 3/2001 | Rochberger et al. |
| 6,222,829 B1 | 4/2001 | Karlsson et al. |
| 6,226,680 B1* | 5/2001 | Boucher et al. ............... 709/230 |
| 6,247,060 B1 | 6/2001 | Boucher et al. |
| 6,272,492 B1 | 8/2001 | Kay |
| 6,310,894 B1 | 10/2001 | Counterman |
| 6,334,153 B2 | 12/2001 | Boucher et al. |
| 6,336,137 B1* | 1/2002 | Lee et al. ...................... 709/219 |
| 6,366,947 B1 | 4/2002 | Kavner |
| 6,381,228 B1 | 4/2002 | Prieto et al. |
| 6,389,479 B1 | 5/2002 | Boucher et al. |
| 6,393,487 B2 | 5/2002 | Boucher et al. |
| 6,427,171 B1 | 7/2002 | Craft et al. |
| 6,427,173 B1 | 7/2002 | Boucher et al. |
| 6,434,620 B1 | 8/2002 | Boucher et al. |
| 6,470,415 B1 | 10/2002 | Starr et al. |
| 6,591,288 B1 | 7/2003 | Edwards et al. |
| 6,591,302 B2 | 7/2003 | Boucher et al. |
| 6,640,248 B1 | 10/2003 | Jorgensen |
| 6,657,957 B1 | 12/2003 | Cheung et al. |
| 6,658,480 B2 | 12/2003 | Boucher et al. |
| 6,687,758 B2 | 2/2004 | Craft et al. |
| 6,697,868 B2 | 2/2004 | Craft et al. |
| 6,728,208 B1 | 4/2004 | Puuskari |
| 6,751,562 B1* | 6/2004 | Blackett et al. ................ 702/61 |
| 6,751,665 B2 | 6/2004 | Philbrick et al. |
| 6,757,746 B2 | 6/2004 | Boucher et al. |
| 6,760,308 B1 | 7/2004 | Ghanma et al. |
| 6,760,336 B1 | 7/2004 | Mangin et al. |
| 6,807,581 B1 | 10/2004 | Starr et al. |
| 6,816,456 B1 | 11/2004 | Tse-Au |
| 6,820,133 B1 | 11/2004 | Grove et al. |
| 6,836,795 B2 | 12/2004 | Soderberg et al. |
| 6,871,224 B1* | 3/2005 | Chu et al. ....................... 709/224 |
| 6,879,526 B2 | 4/2005 | Lynch et al. |
| 6,938,092 B2 | 8/2005 | Burns |
| 6,941,386 B2 | 9/2005 | Craft et al. |
| 6,965,941 B2 | 11/2005 | Boucher et al. |
| 6,996,070 B2 | 2/2006 | Starr et al. |
| 6,999,471 B1 | 2/2006 | Frazer et al. |
| 7,020,719 B1 | 3/2006 | Grove et al. |
| 7,042,898 B2 | 5/2006 | Blightman et al. |
| 7,076,568 B2 | 7/2006 | Philbrick et al. |
| 7,082,467 B2 | 7/2006 | Border et al. |
| 7,085,247 B2 | 8/2006 | Schweinhart et al. |
| 7,089,326 B2 | 8/2006 | Boucher et al. |
| 7,093,099 B2 | 8/2006 | Bodas et al. |
| 7,116,936 B2 | 10/2006 | Kim |
| 7,120,666 B2 | 10/2006 | McCanne et al. |
| 7,124,205 B2 | 10/2006 | Craft et al. |
| 7,133,361 B2 | 11/2006 | Olariu et al. |
| 7,133,940 B2 | 11/2006 | Blightman et al. |
| 7,164,661 B2 | 1/2007 | Kelly |
| 7,167,926 B1 | 1/2007 | Boucher et al. |
| 7,167,927 B2 | 1/2007 | Philbrick et al. |
| 7,170,889 B2 | 1/2007 | Eagling et al. |
| 7,174,393 B2 | 2/2007 | Boucher et al. |
| 7,185,266 B2 | 2/2007 | Blightman et al. |
| 7,191,241 B2 | 3/2007 | Boucher et al. |
| 7,191,318 B2 | 3/2007 | Tripathy et al. |
| 7,213,077 B2 | 5/2007 | Border |
| 7,219,158 B2 | 5/2007 | Border et al. |
| 7,237,036 B2 | 6/2007 | Boucher et al. |
| 7,245,405 B2 | 7/2007 | Friedman et al. |
| 7,245,930 B1 | 7/2007 | Vishwanath et al. |
| 7,254,696 B2 | 8/2007 | Mittal et al. |
| 7,284,070 B2 | 10/2007 | Boucher et al. |
| 7,313,035 B2 | 12/2007 | Lynch et al. |
| 7,336,967 B2 | 2/2008 | Kelly et al. |
| 7,337,233 B2 | 2/2008 | Dillon |
| 7,337,241 B2 | 2/2008 | Boucher et al. |
| 7,359,985 B2 | 4/2008 | Grove et al. |
| 7,370,116 B2 | 5/2008 | Chan et al. |
| 7,386,310 B2 | 6/2008 | Dai et al. |
| 7,388,869 B2 | 6/2008 | Butehorn et al. |
| 7,389,330 B2 | 6/2008 | Dillon et al. |
| 7,389,533 B2 | 6/2008 | Bartlett et al. |
| 7,392,325 B2 | 6/2008 | Grove et al. |
| 7,398,552 B2 | 7/2008 | Pardee et al. |
| 7,418,518 B2 | 8/2008 | Grove et al. |
| 7,525,920 B2 | 4/2009 | Guerin et al. |
| 2001/0021949 A1 | 9/2001 | Blightman et al. |
| 2001/0023460 A1* | 9/2001 | Boucher et al. ............... 709/250 |
| 2001/0027496 A1 | 10/2001 | Boucher et al. |
| 2001/0047433 A1 | 11/2001 | Boucher et al. |
| 2002/0035641 A1 | 3/2002 | Kurose et al. |
| 2002/0087732 A1 | 7/2002 | Boucher et al. |
| 2002/0091844 A1 | 7/2002 | Craft et al. |
| 2002/0095519 A1 | 7/2002 | Philbrick et al. |
| 2002/0103881 A1 | 8/2002 | Granade et al. |
| 2002/0129159 A1 | 9/2002 | Luby et al. |
| 2002/0136240 A1 | 9/2002 | Counterman |
| 2002/0156927 A1 | 10/2002 | Boucher et al. |
| 2003/0026268 A1 | 2/2003 | Navas |
| 2003/0079033 A1 | 4/2003 | Craft et al. |
| 2003/0128710 A1 | 7/2003 | Fedyk et al. |
| 2003/0140124 A1 | 7/2003 | Burns |
| 2003/0147403 A1 | 8/2003 | Border et al. |
| 2003/0167346 A1 | 9/2003 | Craft et al. |
| 2003/0172264 A1 | 9/2003 | Dillon |
| 2003/0177395 A1 | 9/2003 | Pardee et al. |
| 2003/0177396 A1 | 9/2003 | Bartlett et al. |
| 2003/0200284 A1 | 10/2003 | Philbrick et al. |
| 2003/0219022 A1 | 11/2003 | Dillon et al. |
| 2004/0003126 A1 | 1/2004 | Boucher et al. |
| 2004/0010612 A1 | 1/2004 | Pandya |
| 2004/0054813 A1 | 3/2004 | Boucher et al. |
| 2004/0062246 A1 | 4/2004 | Boucher et al. |
| 2004/0064578 A1 | 4/2004 | Boucher et al. |
| 2004/0064589 A1 | 4/2004 | Boucher et al. |
| 2004/0064590 A1 | 4/2004 | Starr et al. |
| 2004/0073703 A1 | 4/2004 | Boucher et al. |
| 2004/0088262 A1 | 5/2004 | Boucher et al. |
| 2004/0117509 A1 | 6/2004 | Craft et al. |
| 2004/0158793 A1 | 8/2004 | Blightman et al. |
| 2004/0202158 A1 | 10/2004 | Takeno et al. |
| 2004/0240435 A1 | 12/2004 | Boucher et al. |
| 2005/0122986 A1 | 6/2005 | Starr et al. |
| 2005/0182841 A1 | 8/2005 | Sharp |

| | | | |
|---|---|---|---|
| 2005/0276275 A1* | 12/2005 | Sabry et al. ............... 370/419 |
| 2006/0010238 A1 | 1/2006 | Craft et al. |
| 2006/0129697 A1* | 6/2006 | Vange et al. ............... 709/245 |
| 2006/0159098 A1 | 7/2006 | Munson et al. |
| 2006/0168281 A1 | 7/2006 | Starr et al. |
| 2007/0022185 A1 | 1/2007 | Hamilton et al. |
| 2007/0110046 A1 | 5/2007 | Farrell et al. |
| 2007/0130356 A1 | 6/2007 | Boucher et al. |
| 2007/0165546 A1 | 7/2007 | Greenberg et al. |
| 2007/0223379 A1 | 9/2007 | Sivakumar et al. |
| 2007/0223481 A1 | 9/2007 | Sivakumar et al. |
| 2008/0022073 A1 | 1/2008 | Mittal et al. |
| 2008/0040519 A1 | 2/2008 | Starr et al. |
| 2008/0062879 A1 | 3/2008 | Sivakumar et al. |
| 2008/0126553 A1 | 5/2008 | Boucher et al. |
| 2008/0151917 A1 | 6/2008 | Bartlett et al. |
| 2008/0238730 A1 | 10/2008 | Eroz et al. |
| 2009/0006920 A1 | 1/2009 | Munson et al. |
| 2009/0052457 A1 | 2/2009 | Salama et al. |
| 2009/0063698 A1 | 3/2009 | Xu et al. |
| 2009/0254655 A1* | 10/2009 | Kidwell et al. ............... 709/224 |

FOREIGN PATENT DOCUMENTS

| | | |
|---|---|---|
| EP | 0794491 | 9/1997 |
| EP | 0828214 | 3/1998 |
| EP | 0942363 | 9/1999 |
| EP | 1087576 | 3/2001 |
| EP | 1333642 | 8/2003 |
| EP | 1443713 | 8/2004 |
| EP | 1443730 | 8/2004 |
| EP | 1443731 | 8/2004 |
| EP | 1443732 | 8/2004 |
| GB | 2309558 | 7/1997 |
| WO | WO 97/29424 | 8/1997 |
| WO | WO 97/30392 | 8/1997 |
| WO | WO 98/26553 | 6/1998 |
| WO | WO 98/28938 | 7/1998 |
| WO | WO 99/09689 | 2/1999 |
| WO | WO 99/18534 | 4/1999 |
| WO | WO 99/57620 | 11/1999 |
| WO | WO 99/57637 | 11/1999 |
| WO | WO 03/104943 | 12/2003 |
| WO | WO 2008/067597 | 6/2008 |

OTHER PUBLICATIONS

R.M. Adler, "Distributed Coordination Models for Client/Server Computing", Apr. 1995, IEEE Computer, pp. 14-22.

J.D. Case, et al., "Simple Network Management Protocol", Internet Engineering Task Force, Request for Comments No. 1157, http://www.ietf.org/rfc/rfc1157.txt, May 1990.

J. Moy, "OSPF Version 2", Internet Engineering Task Force, Request for Comments No. 2328, http://ietf.org/rfc/rfc2328.txt, Apr. 1998.

D Oran, "OSI IS-IS Intra-Domain Routing Protocol", Internet Engineering Task Force, Request for Information No. 1142, http://www.ietf.org/rfc/rfc1142.txt, Feb. 1990.

* cited by examiner

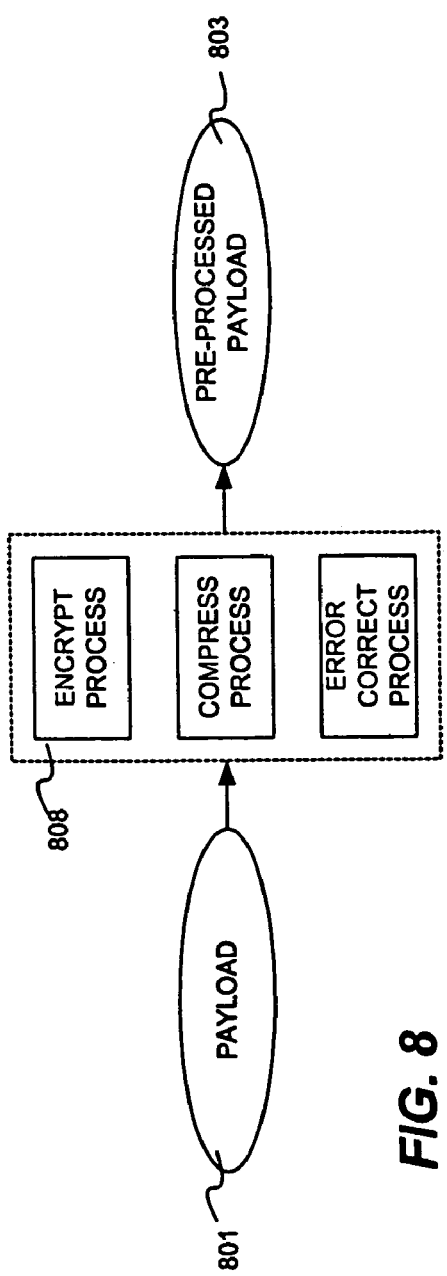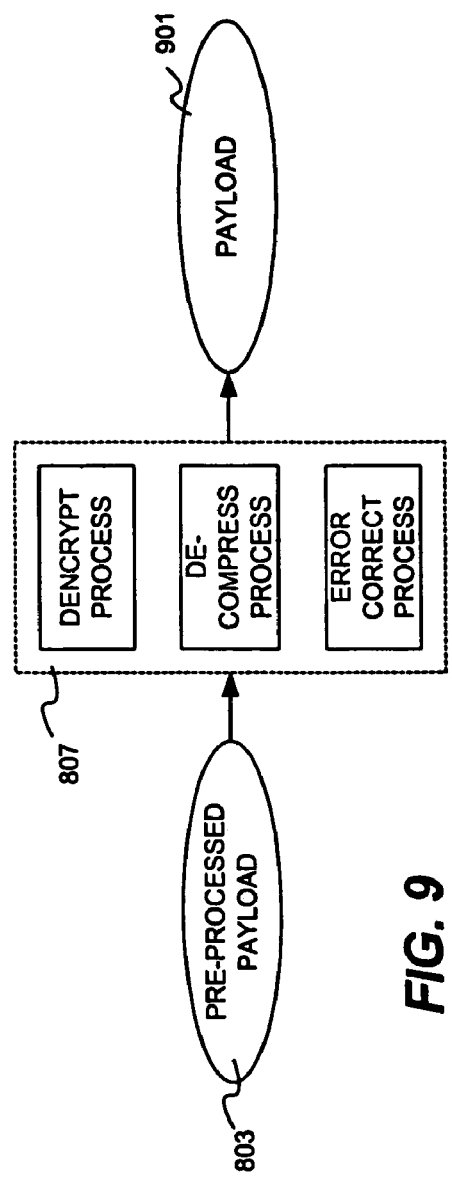

| Time | RAQ ID | Area | Originating Node | Raw Data |
|------|--------|------|------------------|----------|
| 02:30 | 15 | 11 | 23.2.121.2 | 0110001... |
| 02:31 | 16 | 10 | 23.1.23.1 | 0110001... |
| 02:35 | 17 | 12 | 23.4.1.8 | 0110001... |

*FIG. 16*

ROUTE AWARE NETWORK LINK ACCELERATION

CROSS-REFERENCE TO RELATED APPLICATIONS

This application is a continuation-in-part of U.S. patent application Ser. No. 11/346,767, filed Feb. 3, 2006 now U.S. Pat. No. 7,975,066 and a continuation-in-part of U.S. patent application Ser. No. 12/423,392, filed Apr. 14, 2009 now U.S. Pat. No. 8,218,447. U.S. patent application Ser. No. 11/346,767 is a divisional of U.S. patent application Ser. No. 09/835,876, filed Apr. 16, 2001, now U.S. Pat. No. 7,127,518, which claims priority to U.S. Provisional Patent Application No. 60/197,490, filed Apr. 17, 2000. U.S. patent application Ser. No. 12/423,392 is a continuation of Ser. No. 10/895,156, filed Jul. 20, 2004, now U.S. Pat. No. 7,525,920, which is a continuation of U.S. patent application Ser. No. 09/997,420, filed Nov. 29, 2001, now U.S. Pat. No. 6,836,465.

FIELD OF THE INVENTION

The present invention relates, in general, to network performance and, more particularly, to software, systems and methods for implementing route aware dynamic network acceleration functionality within a network infrastructure.

BACKGROUND OF THE INVENTION

Increasingly, business data processing systems, entertainment systems, and personal communications systems are implemented by computers across networks that are interconnected by internetworks (e.g., the Internet). The Internet is rapidly emerging as the preferred system for distributing and exchanging data. Data exchanges support applications including electronic commerce, broadcast and multicast messaging, videoconferencing, gaming, and the like.

The Internet is a collection of disparate computers and networks coupled together by a web of interconnections using standardized communications protocols. The Internet is characterized by its vast reach as a result of its wide and increasing availability and easy access protocols. Unfortunately, the heterogeneous nature of the Internet makes it difficult for the hardware and software that implement the Internet to add functionality.

The Open System Interconnection (OSI) network model usefully describes networked data communication, such as the Internet, as a series of logical layers or protocol layers. Each layer provides services to the layer above it, and shields the layer above it from details of lower layers. Each layer is configured to communicate with other similar level layers. In general, computers at network nodes (e.g., clients and servers) implement higher level processes including application layer, presentation layer, and session layer processes. Lower level processes, including network layer, data link layer and physical layer operate to place data in a form suitable for communication across a raw communication channel or physical link. Between the higher and lower level processes is a transport layer that typically executes on a machine at the network node, but is highly dependent on the lower level processes.

While standards exist for these layers, application designers have a high level of control and can implement semantics and functionality at the higher layers with a great deal of latitude. In contrast, lower layers are highly standardized. Implementing or modifying functionality in a lower layer protocol is very difficult as such changes can affect almost all users of the network. Devices such as routers that are typically associated with infrastructure operate exclusively at the lower protocol layers making it difficult or impossible to implement functionality such as real-time processing, data compression, encryption and error correction within a network infrastructure.

Although the term "Internet infrastructure" encompasses a variety of hardware and software mechanisms, the term primarily refers to routers, router software, and physical links between these routers that function to transport data packets from one network node to another.

Internet infrastructure components such as routers and switches are, by design, asynchronous. Also by design, it is difficult to accurately predict or control the route a particular packet will take through the Internet. This architecture is intended to make the Internet more robust in the event of failures, and to reduce the cost, complexity and management concerns associated with infrastructure components. As a result, however, a particular node or machine cannot predict the capabilities of the downstream mechanisms that it must rely on to deliver a packet to its destination. A sending node cannot expect all mechanisms in the infrastructure to support the functions and/or syntax necessary to implement such functions as real time processing, data compression, encryption, and error correction.

For example, it is difficult if not impossible to conduct synchronous or time-aware operations over the Internet. Such operations include, for example, real-time media delivery, access to financial markets, interactive events, and the like. While each IP packet includes information about the time it was sent, the time base is not synchronous between sender and receiver, making the time indication inaccurate. Packets are buffered at various locations through the Internet infrastructure, and there is no accurate way to ascertain the actual age or time of issue of the packet. Hence, critical packets may arrive too late.

Data compression is a well-known technique to improve the efficiency of data transport over a communication link. Typically, data compression is performed at nodes sending the data and decompression performed at a node receiving the data. Infrastructure components responsible for sending the information between the sending and receiving processes do not analyze whether effective compression has been performed, nor can the infrastructure implement compression on its own. Where either the sending or receiving process is incapable of effective compression, the data goes uncompressed. This creates undesirable burden that affects all users. While modems connecting a user over a phone line often apply compression to that link, there is no analogous function within the Internet infrastructure itself. A need exists for Internet infrastructure components that compress data between network nodes to improve transport within the Internet.

Similarly, encryption and other data security techniques are well known techniques to ensure only authorized users can read data. Like compression, however, encryption is typically performed by user-level and application-level processes. If either sending or receiving process cannot perform compatible encryption, the data must be sent in the clear or by non-network processes. A need exists for Internet infrastructure components that apply encryption or other security processes transparently to users.

As another example, forward error correction (FEC) is a known technique to reduced traffic volume, reduce latency, and/or increase data transfer speed over lossy connections. FEC adds redundant information, also referred to as error correction code, to the original message, allowing the receiver to retrieve the message even if it contains erroneous bits. FEC coding can enhances decoded bit error rate values three order of magnitude relative to systems not implementing any FEC techniques. When the error can be detected and corrected at the receiving end, there is less need to resend data. FEC is extensively used in many digital communication systems at some level and in mass storage technology to compensate for media and storage system errors.

However, FEC is not used within the Internet infrastructure. This stems in part from the additional complexity, cost and management tasks that such capability would impose on the system hardware and software. FEC requires that the sender and receiver both implement compatible FEC processes. Hence, most if not all infrastructure components would have to be replaced or modified to implement FEC in an effective manner. Efforts to implement FEC between sending and receiving nodes are outlined in IETF RFC 2733. This proposed standard applies to real time transport protocol (RTP) communications between a client and server. This FEC method affects endpoints to a data transfer, but does not affect servers and or other infrastructure components located between the endpoints. Hence, a need exists for systems and methods that implement FEC within the Internet infrastructure to offer the benefits of FEC technology seamlessly to network users.

In most cases these types of functionality are implemented in higher level processes (e.g., the OSI application layer, presentation layer, session layer and/or transport layer). However this requires that sending and receiving nodes implement a common syntax. For example, both sending and receiving nodes must implement complementary encryption/decryption processes, however once this is ensured, the communication will be encrypted through out transport. In practice there are multiple standards for real-time processing, encryption, compression, and error correction, and one or the other node may be unable to support the protocols of the other nodes. Hence, it is desirable to implement such functionality is a manner that is independent of the higher level processes so that otherwise incompatible or incapable application-level processes can benefit.

In other cases, for example real time processing and error correction, it is desirable to have the functionality implemented within the network infrastructure, not only between the nodes. For example, implementing error correction only between the sending and receiving nodes is only a partial solution, as the infrastructure components that operate at lower network layers (e.g., transport, network, data link and/or physical layer) cannot read error correction codes inserted at higher network layers. As another example, traffic prioritization within the network benefits from knowledge of when packets were actually sent so that they can be delivered in time for real-time processes.

A particular need exists in environments that involve multiple users accessing a network resource such as a web server. Web servers are typically implemented with rich functionality and are often extensible in that the functionality provided can be increased modularly to provide general-purpose and special-purpose functions. Examples include information services, broadcast, multicast and videoconference services, as well as most electronic commerce (e-commerce) applications. In these applications it is important that functionality provided by network-connected resources be provided in a dependable, timely and efficient manner.

Many e-commerce transactions are abandoned by the user because system performance degradations frustrate the purchaser before the transaction is consummated. While a transaction that is abandoned while a customer is merely browsing through a catalog may be tolerable, abandonment when the customer is just a few clicks away from a purchase is highly undesirable. However, existing Internet transport protocols and systems do not allow the e-commerce site owner any ability to distinguish between the "just browsing" and the "about to buy" customers as this information is represented at higher network layers that are not recognized by the infrastructure components. In fact, the vagaries of the Internet may lead to the casual browser receiving a higher quality of service while the about-to-buy customer becomes frustrated and abandons the transaction. Likewise, with regard to communications in general, the casual communications may undesirably receive higher quality of service than more critical or crucial communications.

The vagaries and distributed nature of the Internet also make accurately characterizing or predicting the behavior of the network at any given time a complex task. Because of this, many of the network management functions that are available for networks based on more traditional technologies, e.g., connection-oriented such as frame relay or asynchronous transfer mode (ATM), are difficult if not impossible to replicate in IP networks. For example, in a connection-oriented network, the state associated with each connection/user provides the network administrator with a ready handle for tracing its path and monitoring the resources it relies on. In contrast, in IP networks because routing decisions are made in a distributed fashion by many routers that are only concerned with local packet forwarding decisions, there is no single entity with complete knowledge of the entire path that a packet will follow at any given time. Again, this makes it more difficult for a network administrator to precisely identify the path that the traffic between, for example, two customer sites, is following when traversing the network.

As a consequence, upon identifying a highly congested link, a network administrator has no or only limited visibility into which customers may be experiencing poor performance as a result of this congestion. Similarly, in the presence of a link failure, identifying which customers are immediately affected as well as predicting which ones may also experience a change in service performance shortly after the failure is again a very complex task in IP networks.

Management tools do exist for IP networks, but they are typically reactive or operate at a coarse granularity, i.e., not at the level of the end-to-end performance of an individual customer or site. For example, routers typically support standard Management Information Bases (MIBs) that can be queried using protocols such as the Simple Network Management Protocol (SNMP). MIBs provide detailed state information about individual routers, e.g., interface status, number of packets or bytes transmitted and received on each interface, etc. However, this information is local to each device, and does not offer a network wide perspective. Furthermore, piecing together MIB information from multiple routers to derive end-to-end performance measures of relevance to a given customer is not an easy task. A similar limitation exists when relying on traffic monitoring information that is routinely gathered at routers using mechanisms such as Cisco's NetFlow™ or Juniper Cflowd™. These monitoring devices capture detailed information about the traffic crossing a given interface, but again do not have the ability to identify end-to-end paths. Converting such traffic monitoring data into end-to-end intelligence is a laborious task.

A few tools exist that are capable of end-to-end sampling of paths traversing an IP network. Most of them are based on two core utilities built into the Internet Protocol, ping and traceroute, which allow a network administrator to probe the network in order to generate estimates of end-to-end performance measures such as packet loss and delay, and record full path information. However, solutions based on utilities such as ping and traceroute often are not desirable because they are neither scalable nor capable of providing real-time information about the network behavior as a user experiences it.

From the discussion that follows, it will become apparent that the present invention addresses the deficiencies associated with the prior art while providing numerous additional advantages and benefits not contemplated or possible with prior art constructions.

SUMMARY OF THE INVENTION

Briefly stated, a route aware network link acceleration system and method implements functionality within a network on behalf of first and second network devices communicating with each other through a network. The functionality provided may utilize an improved monitoring, tracking, and/or prediction of the routing path of one or more packets to enhance the reliability and speed of communication. The route aware network link acceleration system and method may have various configurations as described herein.

In one exemplary embodiment, a method for implementing functionality within a network on behalf of first and second devices communicating with each other through the network is provided. The method may comprise specifying an ordered list of routing events, wherein the ordered list comprises a list of all routing events received after a routing information context was constructed, where the routing information context represents a starting topology and a routing state of a routing domain, and providing the routing information context. Path information between a starting address and a destination address within the network may be constructed using the routing information context, and the routing information context may be updated in accordance with a next routing event in the ordered list of routing events. The constructing and updating steps above may be repeated until reaching a last routing event in the ordered list of routing events.

Based on the path information between the starting address and the destination address, functionality may be implemented within the network on behalf of the first and second devices to reduce a number of hops between the first and second devices relative to a number of hops in the path information between the starting address and the destination address. The functionality may be implemented by providing a front-end device within the network having an interface for communicating data traffic with the first device, providing a back-end device within the network having an interface for communicating data traffic with the second device, and providing a communication channel coupling the front-end device and the back-end device. Data traffic may be encoded over the communication channel in a first process in the front-end device, and in a second process in the back-end device. The encoded data traffic from the front-end device may be decoded in a third process in the back-end device, and the encoded data traffic from the back-end device may be decoded in a fourth process in the front-end device. The first, second, third, and fourth processes may implement preselected compatible semantics to perform the encoding and the decoding on the data traffic. The preselected compatible semantics may comprise processes for sharing operational information for the front-end and back-end computers.

The act of encoding may comprise various actions. For example, the act of encoding may comprise communicating quality of service information about the communication channel between the front-end and back-end devices. The act of encoding may comprise communicating time-based synchronization information defined by the compatible semantics between the front-end and back-end devices, compression/decompression processes defined by the compatible semantics, forward error correction processes defined by the compatible semantics, and/or communicating time-based synchronization information defined by the preselected compatible semantics between the front-end device and the back-end device.

In another exemplary embodiment, a method for transporting data through a communication network between a first device and a second device is provided. This method may include identifying a path of travel from an origin to a destination for a packet in a multi-area domain operated according to a link state routing protocol. The identification of the path of travel may comprise receiving first topology information pertaining to at least one non-local area, and identifying a source for the current area. If the current area includes the origin, the source for the current area may be the origin. If the current area does not include the origin, the source for the current area may correspond to an exit point for a previous area along the path of travel. It is noted that the identifying step further may include identifying all exit points from the current area through which the destination is reachable.

One or more exit points from the current area through which the destination is reachable may be identified. Second topology information may be determined based on the source and the one or more exit points. An exit point may be selected from the one or more exit points, where the selected exit point represents a least cost path to the destination based on the first topology information pertaining to a most recently updated topology between the exit point and the destination and the second topology information. A least cost path segment for the area from the source to the exit point can be constructed, and each least cost path segment may be concatenated to form an end-to-end path. It is noted that each least cost path segment may comprise a series of routers and links or networks between routers.

The method may also include providing a front-end device within the network having an interface for communicating data traffic with the first device, providing a back-end device within the network having an interface for communicating data traffic with the second device, and providing a communication channel coupling the front-end device and the back-end device to transport data between the first and second devices with a reduced number of hops relative to the end-to-end path. It is noted that the origin may be the first device and the destination may be the second device or vice versa.

The front-end device and the back-end device may implement preselected compatible semantics to establish the communication channel. Operational information may be shared between the front-end device and the back-end device through the communication channel, time-based synchronization information may be communicated between the front-end device and the back-end device, and traffic transported across the communication channel may be compressed. It is noted that data may be transported through the communication channel based on an attribute of the data such as but not limited to the size of the data or the application that created that data.

As stated, systems for transporting data through a communication network comprising are also provided herein. To illustrate, an exemplary system for transporting data through a communication network may comprise at least one front-end comprising an interface to communicate data traffic in accordance with a first protocol with one or more clients, at least one back-end comprising an interface to communicate the data traffic in accordance with the first protocol with one or more servers, and at least one route monitoring system configured to provide end-to-end path information for one or more network paths through the network from the clients to the servers.

The system may also include at least one enhanced communication channel between the front-end and the back-end. The enhanced communication channel may be configured to transport the data traffic of the first protocol in an enhanced second protocol. The enhanced communication channel may be implemented to reduce a number of hops between the clients and the servers relative to a number of hops in the one or more network paths.

The route monitoring system may comprise at least one route acquisition module configured to collect one or more routing events advertised by one or more routers in the network, and at least one route aggregation module configured to receive the routing events and determine the end-to-end path information for the network paths.

The front-end and back-end may implement preselected compatible semantics to establish the enhanced communication channel, share operational information between the front-end and back-end through the enhanced communication channel, communicate time-based synchronization information between the front-end and back-end, and/or compress traffic transported across the enhanced communication channel.

Further objects, features, and advantages of the present invention over the prior art will become apparent from the detailed description of the drawings which follows, when considered with the attached figures.

DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 8 illustrates exemplary pre-processing processes;

FIG. 9 illustrates exemplary post-processing processes;

FIG. 16 illustrates an example of a raw advertisements table comprising a collection of information gathered by route acquisition modules;

DETAILED DESCRIPTION OF THE INVENTION

Figure 1:
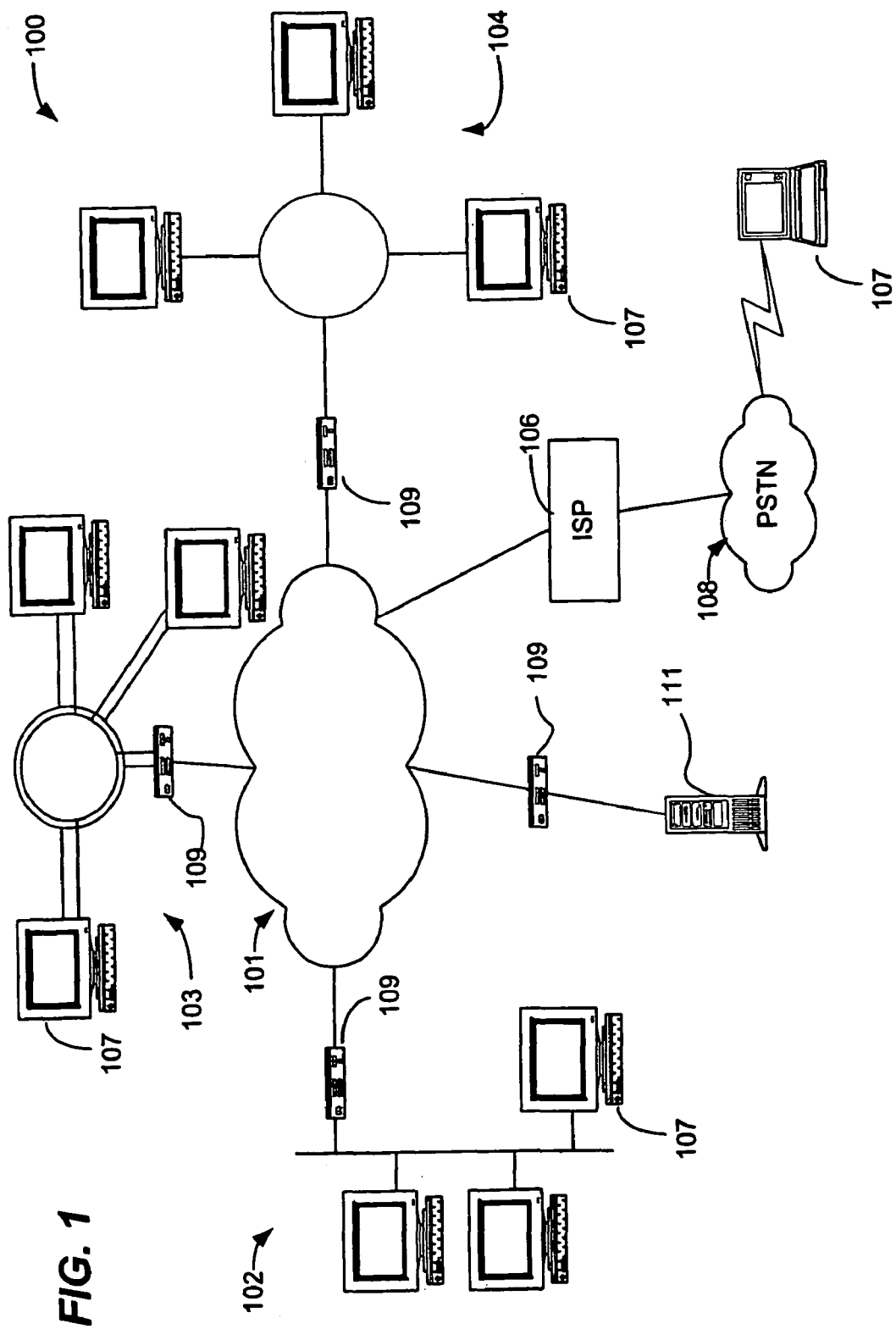
FIG. 1 illustrates a general distributed computing environment in which the present invention is implemented.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

A first set of inventions relate to the improved functionality and metrics available when cooperating front-end and back-end mechanisms, such as servers or other network devices, are used to transport data through the public network. This first class of inventions enable an enhanced communication channel in which both ends can be synchronized and so easily know when the other end performed specific operations such as datagram generation and transmission. This enables each side to take actions based on the knowledge that was previously only available to the transmitting side. Other functionality includes compression of traffic between front-end and back-end mechanisms using public or proprietary data compression that can be readily selected and optimized for the particular content data currently being transported. Similarly, encryption/decryption can be employed between the front-end and back-end mechanisms for enhanced security without impacting either a web server or a web client that are principles of the transaction. Forward error correction can be used to reduce the quantity of traffic, improve latency, and/or increase speed of the transport between front-end and back-end components.

A second set of inventions relates to performance and functionality improvements enabled by implementing the front-end and back-end mechanisms as dynamically re-configurable elements. This second class of inventions enables multiple front-ends to connect with and service multiple back-ends and/or one or more web servers or web sites. These inventions also include the ability for one front-end to service multiple back-ends and by extension multiple web servers or web sites. Similarly, one front-end can service multiple web servers or content providers directly.

In one aspect, the present invention involves a system for multiplexing data from a plurality of links or channels onto a shared bandwidth channel. The plurality of links may be fixed-bandwidth links, or may themselves be shared bandwidth links. The plurality of links may comprise a homogenous user-level protocol, such as HTTP, or may comprise a variety of user level protocols such as HTTP, FTP, NNTP, SMTP and the like. The plurality of links may similarly comprise homogenous network-layer and/or physical layer protocols, or may comprise a varied set of network-layer and physical layer protocols.

The shared bandwidth channel allows a variety of services to be provided. Some advantages are achieved simply by multiplexing multiple links onto a single channel. This combination enables the single channel to be persistent thereby avoiding overhead associated with setting up, maintaining and breaking down connections that would otherwise be required of each the multiple links. The single shared channel can also include more information than the protocols of the plurality of links allow such as time synchronization information and quality of service information.

In a particular embodiment, the shared bandwidth channel transports packets that are composed by selecting data from the plurality of links in an order and rate determined to provide differential levels of service between packets. The differential service levels may mean that some of the data are transported with lower latency and/or higher quality of service than other data. The criteria for providing differential levels of service are not limited, but in particular embodiments are based on content type, user identity, user history, and session statistics.

A third set of inventions relates to an improved method and system for monitoring, tracking, and/or predicting the routing path of one or more packets under an IP protocol. This allows a network administrator, network/route monitoring system, or other human or automated user to identify the path or paths followed or expected to be followed by any packet traveling though an network or routing domain, where the packet has a known entry point or address and a known or anticipated destination address. The destination address is associated with a routing entry, typically from a routing table, and the present invention constructs the path that was or is expected to be followed through the routing domain by the packet associated with the routing entry. Optionally and preferably, when more than one path is possible, the invention is capable of constructing the complete set of possible paths, any of which the packet may follow.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary, the present invention is applicable to significantly larger, more complex network environments, including wireless network environments, as well as small network environments such as conventional LAN systems.

The present invention is particularly useful in applications where there is a large amount of data communicated between web servers and web clients (i.e., browser software) or where timeliness (e.g., low latency transport) is important. For example, real-time stock quotes, multi-player games, multi-tiered service to ASP (application service provider) software distribution models benefit from the improvements provided by the present invention. Although the present invention will be described in terms of particular applications, these examples are provided to enhance understanding and are not a limitation of the essential teachings of the present invention.

For purposes of this document, a web server is a computer running server software coupled to the World Wide Web (i.e., "the web") that delivers or serves web pages. The web server may have a unique IP address and be configured to accept connections in order to service requests by sending back responses. A web server differs from a proxy server or a gateway server in that a web server has resident a set of resources (i.e., software programs, data storage capacity, and/or hardware) that enable it to execute programs to provide an extensible range of functionality such as generating web pages, accessing remote network resources, analyzing contents of packets, reformatting request/response traffic and the like using the resident resources. In contrast, a proxy simply forwards request/response traffic on behalf of a client to resources that reside elsewhere, or obtains resources from a local cache if implemented. A web server in accordance with the present invention may reference external resources of the same or different type as the services requested by a user, and reformat and augment what is provided by the external resources in its response to the user. Commercially available web server software includes Microsoft Internet Information Server (IIS), Netscape Netsite, Apache, among others. Alternatively, a web site may be implemented with custom or semi-custom software that supports HTTP traffic.

FIG. 1 shows an exemplary computing environment 100 in which the present invention may be implemented. Environment 100 includes a plurality of local networks such as Ethernet network 102, FDDI network 103 and Token Ring network 104. Essentially, a number of computing devices and groups of devices are interconnected through a network 101. For example, local networks 102, 103 and 104 are each coupled to network 101 through routers 109. LANs 102, 103 and 104 may be implemented using any available topology and may implement one or more server technologies including, for example UNIX, Novell, or Windows NT networks, or peer-to-peer type network. Each network will include distributed storage implemented in each device and typically includes some mass storage device coupled to or managed by a server computer. Network 101 comprises, for example, a public network such as the Internet or another network mechanism such as a fiber channel fabric or conventional WAN technologies.

Local networks 102, 103 and 104 include one or more network appliances 107. One or more network appliances 107 may be configured as an application and/or file server. Each local network 102, 103 and 104 may include a number of shared devices (not shown) such as printers, file servers, mass storage and the like. Similarly, devices 111 may be shared through network 101 to provide application and file services, directory services, printing, storage, and the like. Routers 109 provide a physical connection between the various devices through network 101. Routers 109 may implement desired access and security protocols to manage access through network 101.

Network appliances 107 may also couple to network 101 through public switched telephone network 108 using copper or wireless connection technology. In a typical environment, an Internet service provider 106 supports a connection to network 101 as well as PSTN 108 connections to network appliances 107.

Network appliances 107 may be implemented as any kind of network appliance having sufficient computational function to execute software needed to establish and use a connection to network 101. Network appliances 107 may comprise workstation and personal computer hardware executing commercial operating systems such as UNIX variants, Microsoft Windows, Macintosh OS, and the like. At the same time, some appliances 107 comprise portable or handheld devices using wireless connections through a wireless access provider such as personal digital assistants and cell phones executing operating system software such as PalmOS, WindowsCE, EPOCOS, and the like. Moreover, the present invention is readily extended to network devices such as office equipment, vehicles, and personal communicators that make occasional connection through network 101.

Each of the devices shown in FIG. 1 may include memory, mass storage, and a degree of data processing capability (e.g. one or more processors) sufficient to manage their connection to network 101. The computer program devices in accordance with the present invention are implemented in the memory of the various devices shown in FIG. 1 and enabled by the data processing capability of the devices shown in FIG. 1. In addition to local memory and storage associated with each device, it is often desirable to provide one or more locations of shared storage such as disk farm (not shown) that provides mass storage capacity beyond what an individual device can efficiently use and manage. Selected components of the present invention may be stored in or implemented in shared mass storage.

Figure 2:
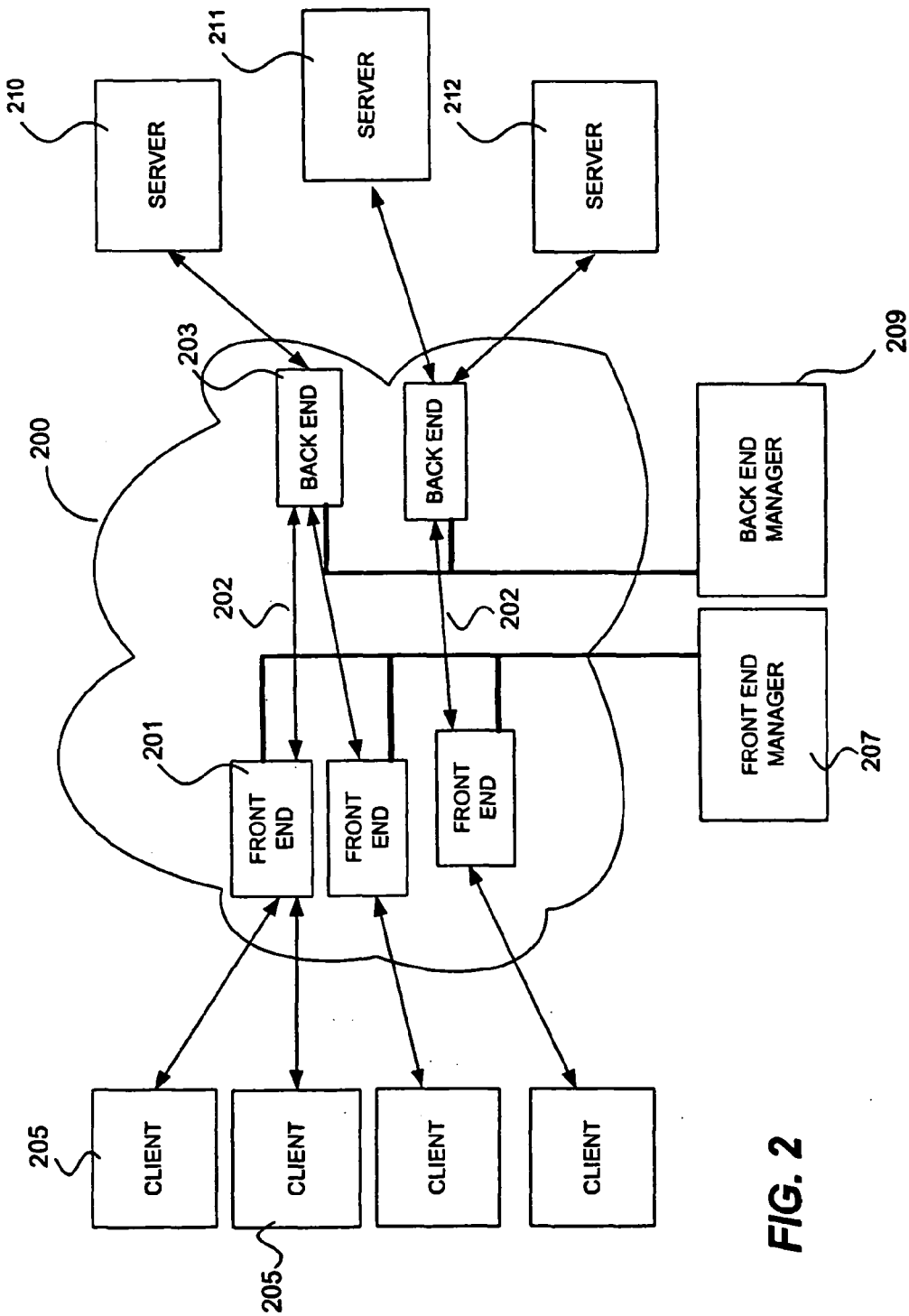
FIG. 2 illustrates in block-diagram form entity relationships in a system in accordance with the present invention.

The present invention operates in a manner akin to a private network 200 implemented within the Internet infrastructure as shown in FIG. 2. Private network 200 enhances communications between a client 205 and a web site 210 by implementing any of a variety of processes that enhance efficiency and/or functionality independently of client 205 and/or server 210. These processes include time synchronization processes, quality of service management processes, compression processes, security processes, and error correction processes.

In the specific examples herein client 205 comprises a network-enabled graphical user interface such as a web browser. However, the present invention is readily extended to client software other than conventional web browser software. Any client application that can access a standard or proprietary user level protocol for network access is a suitable equivalent. Examples include client applications for file transfer protocol (FTP) services, voice over Internet protocol (VoIP) services, network news protocol (NNTP) services, multi-purpose internet mail extensions (MIME) services, post office protocol (POP) services, simple mail transfer protocol (SMTP) services, as well as Telnet services. In addition to network protocols, the client application may access a network application such as a database management system (DBMS) in which case the client application generates query language (e.g., structured query language or "SQL") messages. In wireless appliances, a client application may communicate via a wireless application protocol or the like.

For convenience, the term "web site" is used interchangeably with "web server" in the description herein although it should be understood that a web site comprises a collection of content, programs and processes implemented on one or more web servers. A web site is owned by the content provider such as an e-commerce vendor whereas a web server refers to set of programs running on one or more machines coupled to an Internet node. The web site 210 may be hosted on the site owner's own web server, or hosted on a web server owned by a third party. A web hosting center is an entity that implements one or more web sites on one or more web servers using shared hardware and software resources across the multiple web sites. In a typical web infrastructure, there are many web browsers, each of which has a TCP connection to the web server in which a particular web site is implemented. The present invention adds two components to the infrastructure: a front-end 201 and back-end 203. Front-end 201 and back-end 203 are coupled by a managed data communication link 202 that forms, in essence, a private network.

Front-end mechanism 201 serves as an access point for client-side communications. In the process of translating a requested domain name into an IP address of a particular server hosting the requested domain name, mechanisms described in reference to FIG. 3 operate to select a particular front-end mechanism 201. In effect, the domain is dynamically assigned to the selected front-end mechanism. More than one front-end 201 may host a single domain. So long as a client 205 associates the domain name with the IP address of the selected front-end 201, all client requests to the domain will be routed to the selected front-end 201.

Front-end mechanism 201 implements a set of processes in the dynamically assigned domain that implement a gateway that functions as a substitute for the web server(s) implementing web site 210 (i.e., from the perspective of client 205, front-end 201 appears to be the web site 210). Front-end 201 comprises, for example, a computer that sits "close" to clients 205. By "close", it is meant that the average latency associated with a connection between a client 205 and a front-end 201 is less than the average latency associated with a connection between a client 205 and a web site 210. Desirably, front-end computers have as fast a connection as possible to the clients 205. For example, the fastest available connection may be implemented in a point of presence (POP) of an Internet service provider (ISP) 106 used by a particular client 205. However, the placement of the front-ends 201 can limit the number of browsers that can use them. Because of this, in some applications it is more practical to place one front-end computer in such a way that several POPs can connect to it. Greater distance between front-end 201 and clients 205 may be desirable in some applications as this distance will allow for selection amongst a greater number front-ends 201 and thereby provide significantly different routes to a particular back-end 203. This may offer benefits when particular routes and/or front-ends become congested or otherwise unavailable.

The managed communication link 202 is implemented by cooperative actions of the front-end 201 and back-end 203. The back-end 203 processes and directs data communication to and from web site 210. In preferred embodiments, the communication link 202 communicates data packets using a proprietary protocol called Transport Morphing Protocol™ or TMP™. Thus, the managed communication link 202 may also be referred to as an enhanced link or a TMP link. Transport morphing protocol and TMP are trademarks or registered trademarks of Circadence Corporation in the United States and other countries. TMP is implemented over the public Internet infrastructure in the particular example. Hence, the present invention does not require heavy infrastructure investments and automatically benefits from improvements implemented in the general purpose network 101. Unlike the general purpose Internet, front-end 201 and back-end 203 are programmably assigned to serve accesses to a particular web site 210 at any given time.

It is contemplated that any number of front-end and back-end mechanisms may be implemented cooperatively to support the desired level of service required by the web site owner. The present invention implements a many-to-many mapping of front-ends to back-ends. Because the front-end to back-end mappings can be dynamically changed, a fixed hardware infrastructure can be logically reconfigured to map more or fewer front-ends to more or fewer back-ends and web sites or servers as needed.

Front-end 201 together with back-end 203 function to reduce traffic across the TMP link 202 and to improve response time for selected browsers. Traffic across the TMP link 202 is reduced, for example, by compressing data. Compression can be implemented using any available compression mechanism and may operate on a packet-by-packet level or by assembling data from multiple packets to compress across a larger data set. Although compression may be applied equally to all data, it is known that some types of data do not benefit from compression. It is also known that certain compression mechanisms and algorithms are better suited for particular types of data. Accordingly, the present invention contemplates the dynamic selection of a compression mechanism based on the type of data being processed. For example, HTML data, which makes up a large proportion of web-based traffic, typically includes ASCII text which is known to compress well using, for example, compressed HTML mechanisms. Encrypted data, however, often does not compress well. Accordingly, the present invention may be implemented to apply compressed HTML techniques to HTML packets while passing encrypted packets (e.g., packets using a secure HTTP scheme) without attempting encryption. So long as front-end 201 and back-end 203 share a common semantic for performing the compression/decompression processes, any available algorithm may be implemented.

Encryption processes are largely analogous to compression processes in that they may be implemented by a number of available cipher algorithms and mechanisms including stream ciphers and block ciphers providing various levels of data security. It usually is not valuable to encrypt data that is already encrypted, hence it is contemplated that encryption may be selectively applied. Moreover, a vast majority of data transferred in many applications does not require encryption at all. The particular encryption mechanism used by the front-end 201 and back-end 203 can be selected based upon the type of data, or designated on a file-by-file basis by a manager of server 210, for example. Front-end 201 and back-end 203 must share a common encryption/decryption semantic, however.

In one embodiment, front-end 201 and back-end 203 share operational information such as time synchronization and quality of service metrics with each other. This information is readily communicated by specially designated packets transmitted on TMP link 202, and/or by including a portion of each TMP packet that is used to exchange this operational information. Traffic across link 202 is preferably managed by selectively transmitting packets at a rate determined to provide adequate quality of service and suitable packet delivery time using this knowledge shared between the front-end 201 and back-end 203. Optionally, this operational information can be shared with processes running on client 205 and/or server 210 as well, although such sharing would require special configuration of client 205 and/or server 210 and is not required to achieve the benefits of the present invention.

Traffic may be further reduced by using forward error correction (FEC) techniques to compensate for lossy connections. A variety of FEC techniques are known that add various amounts of overhead to the traffic. The selection of a particular method depends on the quality of service (i.e., transit times and packet loss rate and/or bit error rate) of the communication channel being used. In one implementation, a statically defined FEC mechanism can be implemented between front-end 201 and back-end 203 based on average or worst-case quality of service (QoS). However, because both front-end 201 and back-end 203 have knowledge of the QoS metrics of each other and are time synchronized, it is contemplated that the FEC mechanisms can be adaptive to current QoS metrics. For example, a data packets may be encoded with a 1-bit/byte error correction code during times of high QoS, and dynamically changed to a 3-bit/byte or 4-bit/byte error correction (or higher) encoding when QoS degrades. So long as front-end 201 and back-end 203 share a common semantic for handling the FEC processes, the actual implementation of those processes is very flexible and can be dynamically defined.

The blending of request datagrams results in fewer request: acknowledge pairs across the TMP link 202 as compared to the number required to send the packets individually between front-end 201 and back-end 203. This action reduces the overhead associated with transporting a given amount of data, although conventional request:acknowledge traffic is still performed on the links coupling the front-end 201 to client 205 and back-end 203 to a web server. Moreover, resend traffic is significantly reduced further reducing the traffic. Response time is further improved for select privileged users and for specially marked resources by determining the priority for each HTTP transmission.

In one embodiment, front-end 201 and back-end 203 are closely coupled to the Internet backbone. This means they have high bandwidth connections, can expect fewer hops, and have more predictable packet transit time than could be expected from a general-purpose connection. Although it is preferable to have low latency connections between front-ends 201 and back-ends 203, a particular strength of the present invention is its ability to deal with latency by enabling efficient transport and traffic prioritization. Hence, in other embodiments front-end 201 and/or back-end 203 may be located farther from the Internet backbone and closer to clients 205 and/or web servers 210. Such an implementation reduces the number of hops required to reach a front-end 201 while increasing the number of hops within the TMP link 202 thereby yielding control over more of the transport path to the management mechanisms of the present invention.

Clients 205 no longer conduct all data transactions directly with the web server 210. Instead, clients 205 conduct some and preferably a majority of transactions with front-ends 201, which simulate the functions of web server 210. Client data is then sent, using TMP link 202, to the back-end 203 and then to the web server 210. Running multiple clients 205 over one large connection provides several advantages:

- Since all client data is mixed, each client can be assigned a priority. Higher priority clients, or clients requesting higher priority data, can be given preferential access to network resources so they receive access to the channel sooner while ensuring low-priority clients receive sufficient service to meet their needs.
- The large connection between a front-end 201 and back-end 203 can be permanently maintained, shortening the many TCP/IP connection sequences normally required for many clients connecting and disconnecting.
- Services such as encryption, compression, error correction and time synchronization that may not be available or efficiently implemented in particular clients 205 can be practically implemented in TMP link where the resources required to provide these services are shared across multiple clients 205.

Using a proprietary protocol allows the use of more effective techniques to improve data throughput and makes better use of existing bandwidth during periods when the network is congested.

A particular advantage of the architecture shown in FIG. 2 is that it is readily scaled. Any number of client machines 205 may be supported. In a similar manner, a web site owner may choose to implement a site using multiple web servers 210 that are co-located or distributed throughout network 101. To avoid congestion, additional front-ends 201 may be implemented or assigned to particular web sites. Each front-end 201 is dynamically re-configurable by updating address parameters to serve particular web sites. Client traffic is dynamically directed to available front-ends 201 to provide load balancing. Hence, when quality of service drops because of a large number of client accesses, an additional front-end 201 can be assigned to the web site and subsequent client requests directed to the newly assigned front-end 201 to distribute traffic across a broader base.

In the particular examples, this is implemented by a front-end manager component 207 that communicates with multiple front-ends 201 to provide administrative and configuration information to front-ends 201. Each front-end 201 includes data structures for storing the configuration information, including information identifying the IP addresses of web servers 210 to which they are currently assigned. Other administrative and configuration information stored in front-end 201 may include information for prioritizing data from and to particular clients, quality of service information, and the like.

Similarly, additional back-ends 203 can be assigned to a web site to handle increased traffic. Back-end manager component 209 couples to one or more back-ends 203 to provide centralized administration and configuration service. Back-ends 203 include data structures to hold current configuration state, quality of service information and the like. In the particular examples a front-end manager 207 and a back-end manager 209 serve multiple web sites 210 and so are able to manipulate the number of front-ends and back-ends assigned to each web site 210 by updating this configuration information. When the congestion for the site subsides, the front-end 201 and back-end 203 can be reassigned to other, busier web sites. These and similar modifications are equivalent to the specific examples illustrated herein.

In the case of web-based environments, front-end 201 is implemented using custom or off-the-shelf web server software. Front-end 201 is readily extended to support other, non-web-based protocols, however, and may support multiple protocols for varieties of client traffic. Front-end 201 processes the data traffic it receives, regardless of the protocol of that traffic, to a form suitable for transport by link 202 to a back-end 203. Hence, most of the functionality implemented by front-end 201 is independent of the protocol or format of the data received from a client 205. Hence, although the discussion of the exemplary embodiments herein relates primarily to front-end 201 implemented as a web server, it should be noted that, unless specified to the contrary, web-based traffic management and protocols are merely examples and not a limitation of the present invention.

As shown in FIG. 2, in accordance with the present invention a web site is implemented using an originating web server 210 operating cooperatively with the web server of front-end 201. More generally, any network service (e.g., FTP, VoIP, NNTP, MIME, SMTP, Telnet, DBMS) can be implemented using a combination of an originating server working cooperatively with a front-end 201 configured to provide a suitable interface (e.g., FTP, VoIP, NNTP, MIME, SMTP, Telnet, DBMS, WAP) for the desired service. In contrast to a simple front-end cache or proxy software, implementing a server in front-end 201 enables portions of the web site (or other network service) to actually be implemented in and served from both locations. The actual web pages or service being delivered comprises a composite of the portions generated at each server. Significantly, however, the web server in front-end 201 is close to the browser in a client 205 whereas the originating web server is close to all resources available at the web hosting center at which web site 210 is implemented. In essence the web site 210 is implemented by a tiered set of web servers comprising a front-end server 201 standing in front of an originating web server.

This difference enables the web site or other network service to be implemented so as to take advantage of the unique topological position each entity has with respect to the client 205. By way of a particular example, consider an environment in which the front-end server 201 is located at the location of an ISP used by a particular set of clients 205 and back-end 203 is closely coupled by a private channel to server 210. In such an environment, clients 205 can access the front-end server 205 without actually traversing the network 101, hence the need for encryption and error correction and time synchronization services are relaxed with respect to the client-to-front-end link. In such cases the services provided transparently by enhanced channel 202 are substantially a complete substitute for prior services implemented by modifying client 205 and server 210 themselves.

Figure 3:
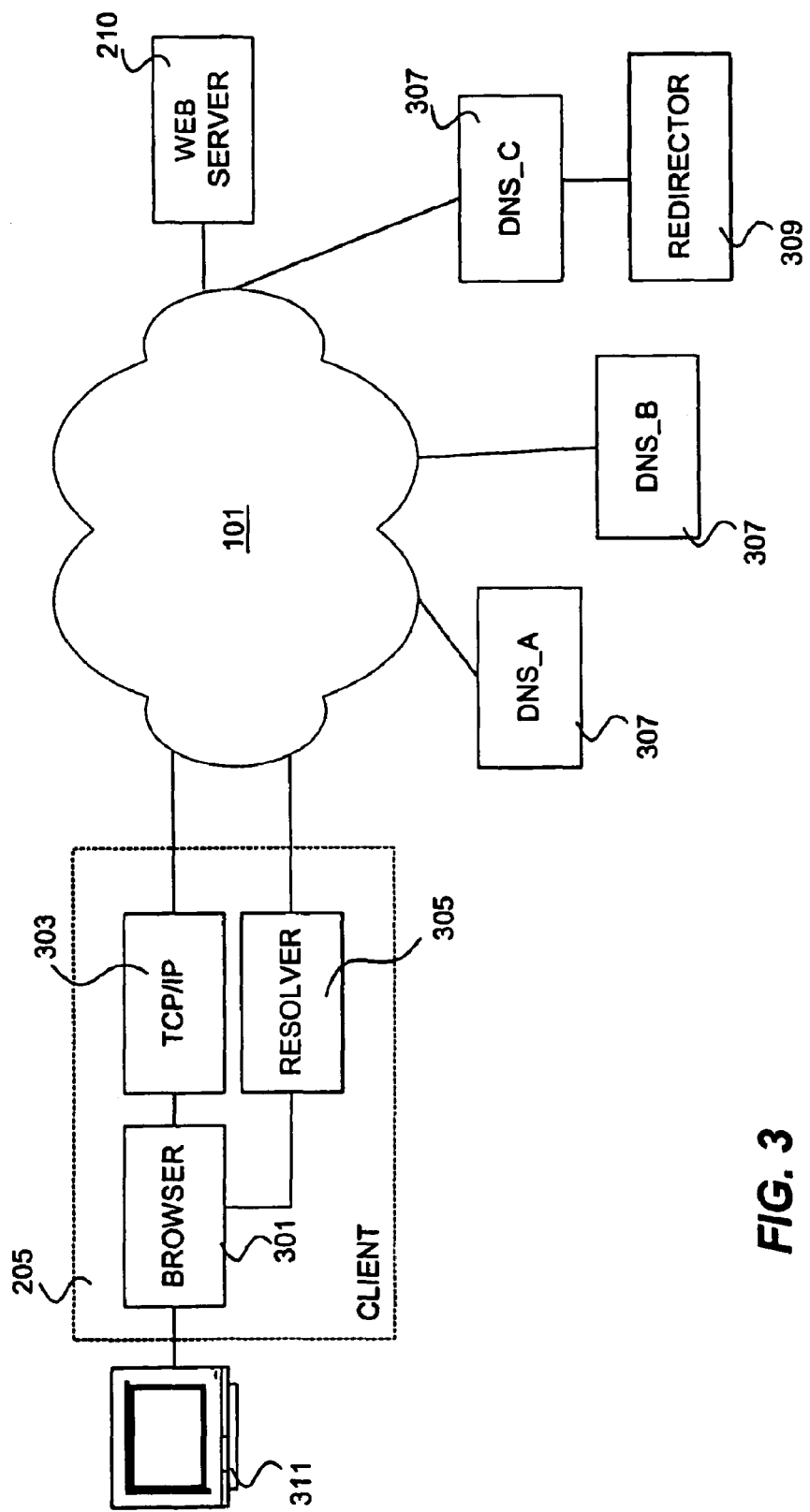
FIG. 3 illustrates a domain name system used in an implementation of the present invention.

In order for a client 205 to obtain service from a front-end 201, it must first be directed to a front-end 201 that can provide the desired service. Preferably, client 205 does not need to be aware of the location of front-end 201, and initiates all transactions as if it were contacting the originating server 210. FIG. 3 illustrates a domain name server (DNS) redirection mechanism that illustrates how a client 205 is connected to a front-end 201. The DNS systems is defined in a variety of Internet Engineering Task Force (IETF) documents such as RFC0883, RFC 1034 and RFC 1035 which are incorporated by reference herein. In a typical environment, a client 205 executes a browser 301, TCP/IP stack 303, and a resolver 305. For reasons of performance and packaging, browser 301, TCP/IP stack 303 and resolver 305 are often grouped together as routines within a single software product.

Browser 301 functions as a graphical user interface to implement user input/output (I/O) through monitor 311 and associated keyboard, mouse, or other user input device (not shown). Browser 301 is usually used as an interface for web-based applications, but may also be used as an interface for other applications such as email and network news, as well as special-purpose applications such as database access, telephony, and the like. Alternatively, a special-purpose user interface may be substituted for the more general-purpose browser 301 to handle a particular application.

TCP/IP stack 303 communicates with browser 301 to convert data between formats suitable for browser 301 and IP format suitable for Internet traffic. TCP/IP stack also implements a TCP protocol that manages transmission of packets between client 205 and an Internet service provider (ISP) or equivalent access point. IP protocol requires that each data packet include, among other things, an IP address identifying a destination node. In current implementations the IP address comprises a 32-bit value that identifies a particular Internet node. Non-IP networks have similar node addressing mechanisms. To provide a more user-friendly addressing system, the Internet implements a system of domain name servers that map alpha-numeric domain names to specific IP addresses. This system enables a name space that is more consistent reference between nodes on the Internet and avoids the need for users to know network identifiers, addresses, routes and similar information in order to make a connection.

The domain name service is implemented as a distributed database managed by domain name servers (DNSs) 307 such as DNS_A, DNS_B and DNS_C shown in FIG. 3. Each DNS relies on <domain name:IP> address mapping data stored in master files scattered through the hosts that use the domain system. These master files are updated by local system administrators. Master files typically comprise text files that are read by a local name server, and hence become available through the name servers 307 to users of the domain system.

The user programs (e.g., clients 205) access name servers through standard programs such as resolver 305. Resolver 305 includes an address of a DNS 307 that serves as a primary name server. When presented with a reference to a domain name (e.g., http://www.circadence.com), resolver 305 sends a request to the primary DNS (e.g., DNS_A in FIG. 3). The primary DNS 307 returns either the IP address mapped to that domain name, a reference to another DNS 307 which has the mapping information (e.g., DNS_B in FIG. 3), or a partial IP address together with a reference to another DNS that has more IP address information. Any number of DNS-to-DNS references may be required to completely determine the IP address mapping.

In this manner, the resolver 305 becomes aware of the IP address mapping which is supplied to TCP/IP component 303. Client 205 may cache the IP address mapping for future use. TCP/IP component 303 uses the mapping to supply the correct IP address in packets directed to a particular domain name so that reference to the DNS system need only occur once.

In accordance with the present invention, at least one DNS server 307 is owned and controlled by system components of the present invention. When a user accesses a network resource (e.g., a web site), browser 301 contacts the public DNS system to resolve the requested domain name into its related IP address in a conventional manner. In a first embodiment, the public DNS performs a conventional DNS resolution directing the browser to an originating server 210 and server 210 performs a redirection of the browser to the system owned DNS server (i.e., DNC_C in FIG. 3). In a second embodiment, domain:address mappings within the DNS system are modified such that resolution of the of the originating server's domain automatically return the address of the system-owned DNS server (DNS_C). Once a browser is redirected to the system-owned DNS server, it begins a process of further redirecting the browser 301 to the best available front-end 201.

Unlike a conventional DNS server, however, the system-owned DNS_C in FIG. 3 receives domain:address mapping information from a redirector component 309. Redirector 309 is in communication with front-end manager 207 and back-end manager 209 to obtain information on current front-end and back-end assignments to a particular server 210. A conventional DNS is intended to be updated infrequently by reference to its associated master file. In contrast, the master file associated with DNS_C is dynamically updated by redirector 309 to reflect current assignment of front-end 201 and back-end 203. In operation, a reference to web server 210 (e.g., http://www.circadence.com) may result in an IP address returned from DNS_C that points to any selected front-end 201 that is currently assigned to web site 210. Likewise, web site 210 may identify a currently assigned back-end 203 by direct or indirect reference to DNS_C.

Front-end 201 typically receives information directly from front-end manager 207 about the address of currently assigned back-ends 203. Similarly, back-end 203 is aware of the address of a front-end 201 associated with each data packet. Hence, reference to the domain system is not required to map a front-end 201 to its appropriate back-end 203.

Figure 4:
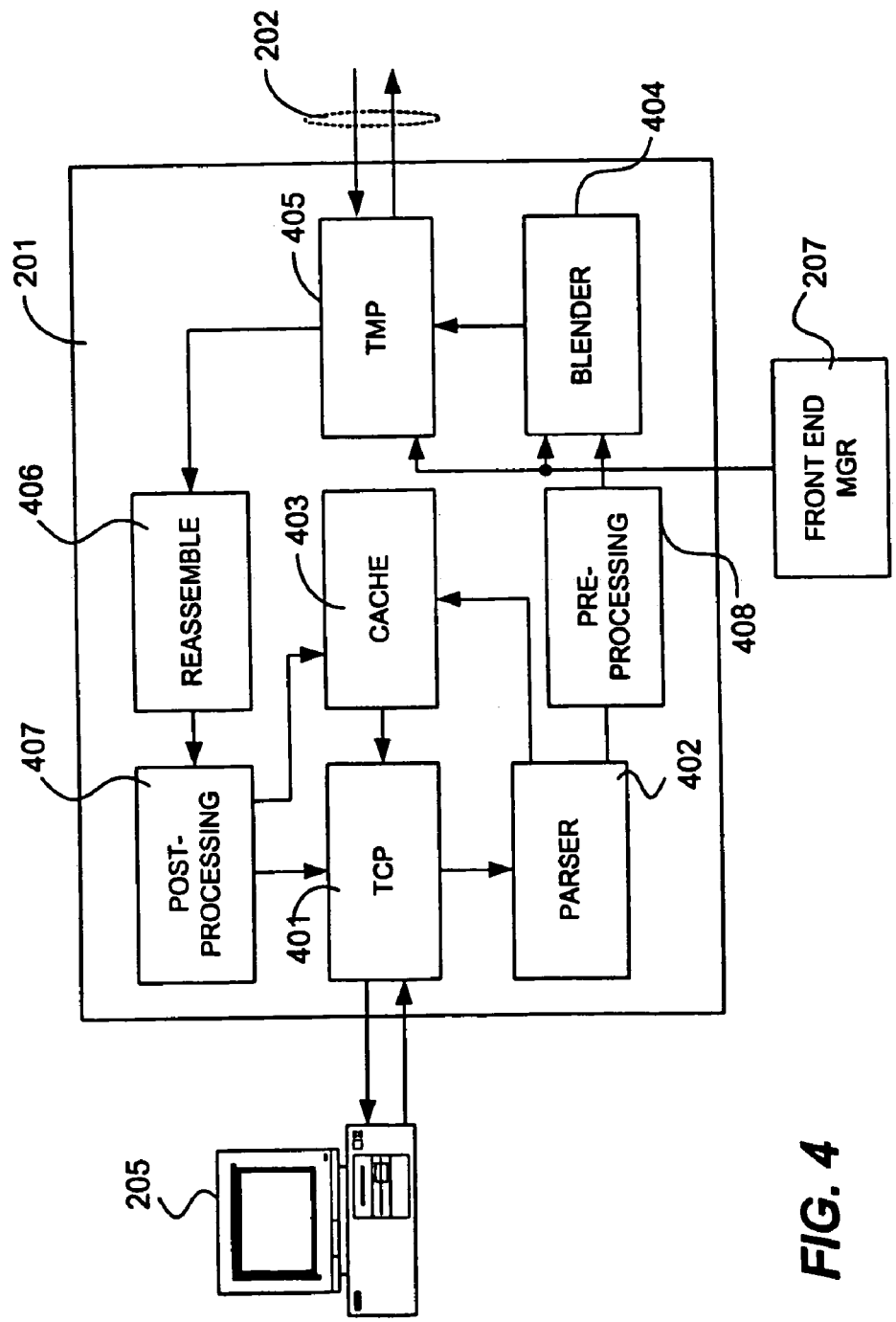
FIG. 4 illustrates front-end components of FIG. 2 in greater detail.

FIG. 4 illustrates principle functional components of an exemplary front-end 201 in greater detail. Primary functions of the front-end 201 include translating transmission control protocol (TCP) packets from client 205 into TMP packets used in the system in accordance with the present invention. It is contemplated that various functions described in reference to the specific examples may be implemented using a variety of data structures and programs operating at any location in a distributed network. For example, a front-end 201 may be operated on a network appliance 107 or server within a particular network 102, 103, or 104 shown in FIG. 1.

TCP component 401 includes devices for implementing physical connection layer and Internet protocol (IP) layer functionality. Current IP standards are described in IETF documents RFC0791, RFC0950, RFC0919, RFC0922, RFC792, RFC1112 that are incorporated by reference herein. For ease of description and understanding, these mechanisms are not described in great detail herein. Where protocols other than TCP/IP are used to couple to a client 205, TCP component 401 is replaced or augmented with an appropriate network protocol process.

TCP component 401 communicates TCP packets with one or more clients 205. Received packets are coupled to parser 402 where the Internet protocol (or equivalent) information is extracted. TCP is described in IETF RFC0793 which is incorporated herein by reference. Each TCP packet includes header information that indicates addressing and control variables, and a payload portion that holds the user-level data being transported by the TCP packet. The user-level data in the payload portion typically comprises a user-level network protocol datagram.

Parser 402 analyzes the payload portion of the TCP packet. In the examples herein, HTTP is employed as the user-level protocol because of its widespread use and the advantage that currently available browser software is able to readily use the HTTP protocol. In this case, parser 402 comprises an HTTP parser. More generally, parser 402 can be implemented as any parser-type logic implemented in hardware or software for interpreting the contents of the payload portion. Parser 402 may implement file transfer protocol (FTP), mail protocols such as simple mail transport protocol (SMTP), structured query language (SQL) and the like. Any user-level protocol, including proprietary protocols, may be implemented within the present invention using appropriate modification of parser 402.

To improve performance, front-end 201 optionally includes a caching mechanism 403. Cache 403 may be implemented as a passive cache that stores frequently and/or recently accessed web pages or as an active cache that stores network resources that are anticipated to be accessed. In non-web applications, cache 403 may be used to store any form of data representing database contents, files, program code, and other information. Upon receipt of a TCP packet, HTTP parser 402 determines if the packet is making a request for data within cache 403. If the request can be satisfied from cache 403, the data is supplied directly without reference to web server 210 (i.e., a cache hit). Cache 403 implements any of a range of management functions for maintaining fresh content. For example, cache 403 may invalidate portions of the cached content after an expiration period specified with the cached data or by web sever 210. Also, cache 403 may proactively update the cache contents even before a request is received for particularly important or frequently used data from web server 210. Cache 403 evicts information using any desired algorithm such as least recently used, least frequently used, first in/first out, or random eviction. When the requested data is not within cache 403, a request is processed to web server 210, and the returned data may be stored in cache 403.

Several types of packets will cause parser 404 to forward a request towards web server 210. For example, a request for data that is not within cache 403 (or if optional cache 403 is not implemented) will require a reference to web server 210. Some packets will comprise data that must be supplied to web server 210 (e.g., customer credit information, form data and the like). In these instances, HTTP parser 402 couples to data blender 404.

In accordance with the present invention, front-end 201 implements security processes, compression processes, encryption processes, error correction processes and the like to condition the received data for improved transport performance and/or provide additional functionality. These processes may be implemented within pre-processing unit 408, or alternatively implemented within any of the functional components within front-end 201. Also, front-end 201 may implement a prioritization program to identify packets that should be given higher priority service. A prioritization program requires only that front-end 201 include a data structure associating particular clients 205 or particular TCP packet types or contents with a prioritization value. Based on the prioritization value, parser 402 may selectively implement such features as caching, encryption, security, compression, error correction and the like to improve performance and/or functionality. The prioritization value is provided by the owners of web site 210, for example, and may be dynamically altered, statically set, or updated from time to time to meet the needs of a particular application.

Blender 404 slices and/or coalesces the data portions of the received packets into a more desirable "TMP data units" that are sized for transport through the TMP link 202. The data portion of TCP packets may range in size depending on client 205 and any intervening links coupling client 205 to TCP component 401. Moreover, where compression is applied, the compressed data will vary in size depending on the compressibility of the data. Data blender 404 receives information from front-end manager 217 that enables selection of a preferable TMP packet size. Alternatively, a fixed TMP packet size can be set that yields desirable performance across TMP link 202. Data blender 404 also marks the TMP data units so that they can be re-assembled at the receiving end. Data blender 404 may also serve as a buffer for storing packets from all appliances 107 that are associated with front-end 201. In accordance with the present invention, data blender 404 may associate a prioritization value with each packet.

TMP link utilizes a TMP protocol, described in greater detail hereinbelow, to communicate TMP packets. Received TMP packets include subpackets from multiple TCP connections. The data portions of subpackets are reassembled by reassemble mechanism 406 into a form suitable for return to the requesting client 205. For example, in an HTTP environment reassemble mechanism 406 creates HTTP response payloads akin to what would have been generated by an origin server 210.

Postprocessing mechanism 407 performs decompression, decryption, forward error correction and the like on packets received from a back-end 203. As described hereinafter with respect to FIG. 5, back-end 203 preferably includes pre-processing mechanisms 508 that are analogous to pre-processing mechanisms 408. Hence, post-processing mechanisms 407 restore the data to a form usable by a client 205 without additional processing. Accordingly, client 205 need not implement any of the pre-processing or post processing functions while still realizing the benefits of these processes.

Figure 5:
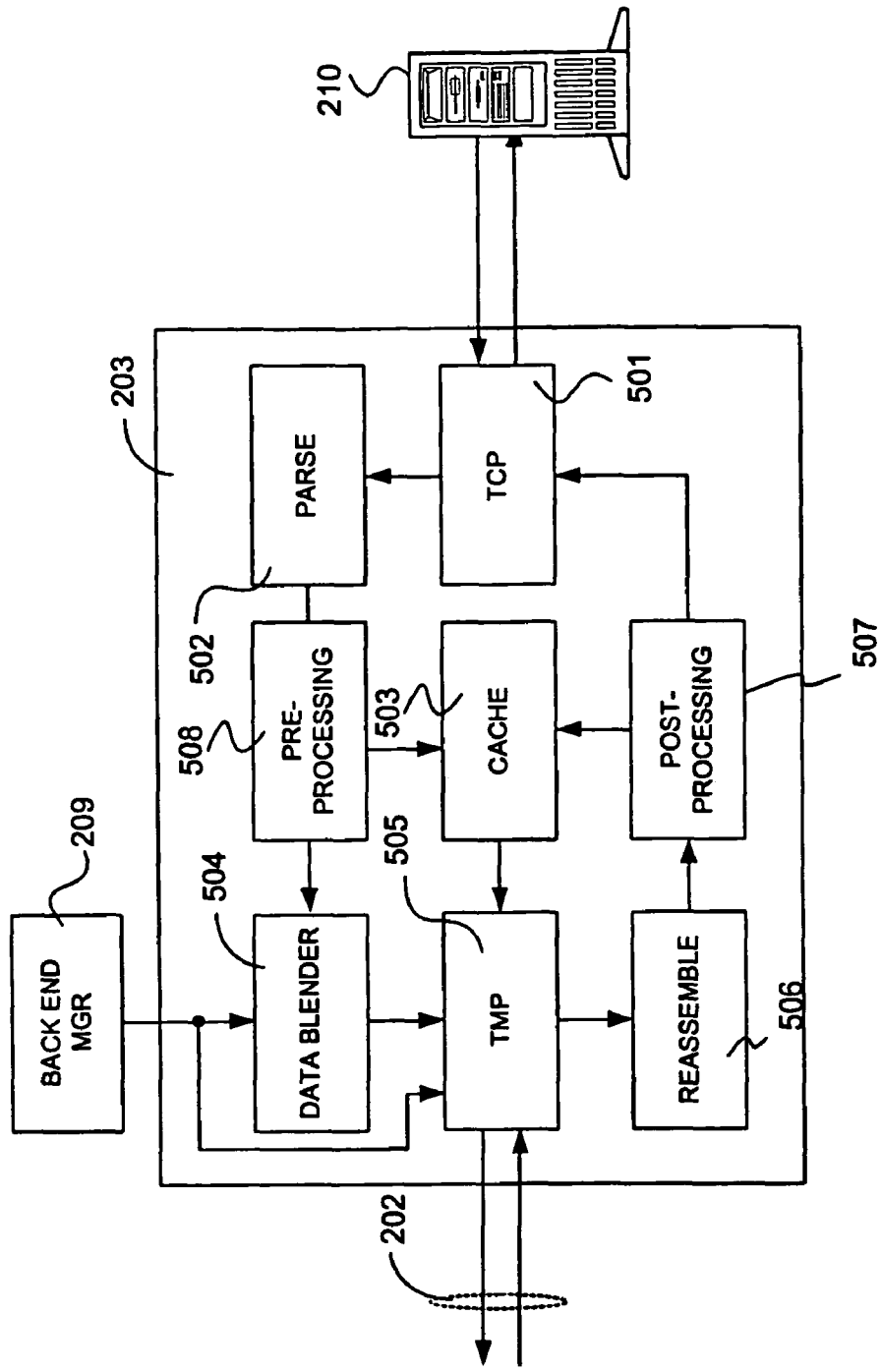
FIG. 5 illustrates back-end components of FIG. 2 in greater detail.

FIG. 5 illustrates principle functional components of an exemplary back-end 203 in greater detail. Primary functions of the back-end 203 include translating transmission control protocol (TCP) packets from web server 210 into TMP packets as well as translating TMP packets received from a front-end 201 into the one or more corresponding TCP packets to be send to server 210. Further, back-end 203 is able to implement similar or complementary functionality to that of front-end 203. In this manner, back-end 203 can operate as a web server to retrieve content and generate web pages, analyze and reformat web pages and components within web pages, and similar server functionality that would conventionally be implemented in a server 210. In general, any functionality and behavior described herein that can be implemented on server 210 and/or front-end server 201 can also be implemented on back-end server 203.

TMP unit 505 receives TMP packets from TMP link 202 and passes them to HTTP reassemble unit 507 where they are reassembled into the corresponding TCP packets. Data filter 506 may implement other functionality such as decompression, decryption, and the like to meet the needs of a particular application. The reassembled data is forwarded to TCP component 501 for communication with web server 210.

TCP data generated by the web server process are transmitted to TCP component 501 and forwarded to HTTP parse mechanism 502. Parser 502 operates in a manner analogous to parser 402 shown in FIG. 5 to extract the data portion from the received TCP packets. Pre-processing mechanism 508 and post-processing mechanism 507 operate in an analogous fashion to components 407 and 408 to perform compression, encryption, error correction, and the like, and forward those packets to data blender 504. Data blender 504 operates in a manner akin to data blender 404 shown in FIG. 5 to buffer and prioritize packets in a manner that is efficient for TMP transfer. Priority information is received by, for example, back-end manager 209 based upon criteria established by the web site owner. TMP data is streamed into TMP unit 505 for communication on TMP link 202.

Figure 6:
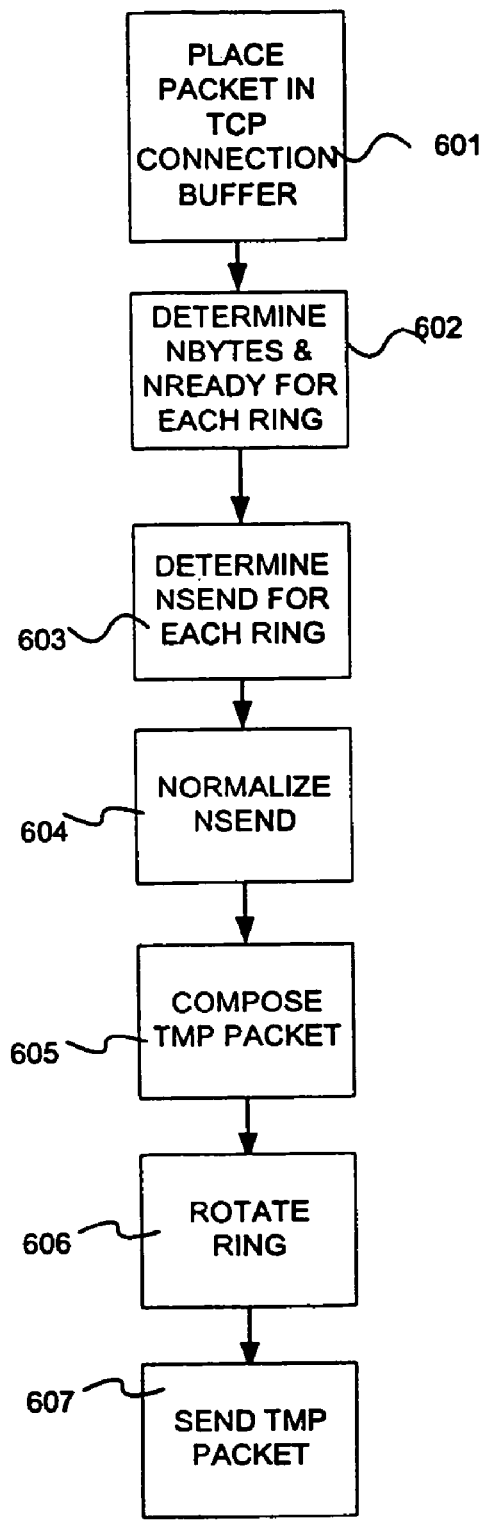
FIG. 6 illustrates in flow-diagram form processes involved in an exemplary implementation of the present invention.
Figure 7:
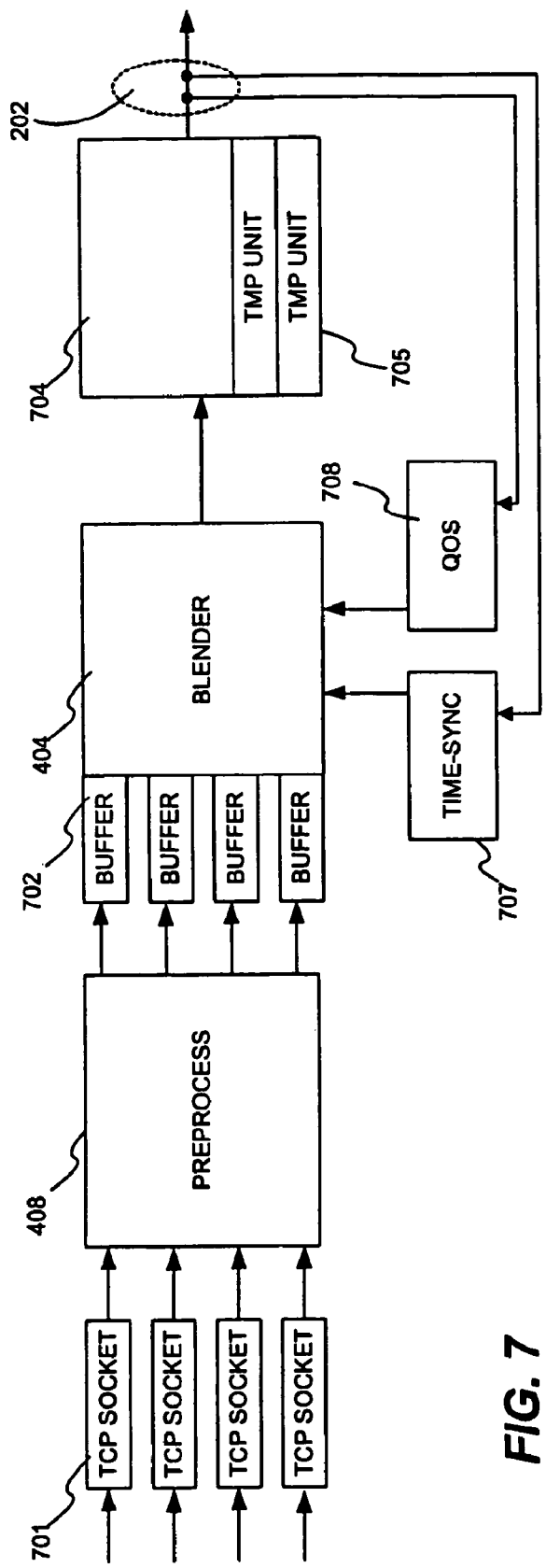
FIG. 7 illustrates a conceptual block diagram of particular components introduced in FIG. 2 in greater detail.

In an exemplary implementation, illustrated in FIG. 6 and FIG. 7, a "TMP connection" comprises a plurality of "TCP connection buffers", logically arranged in multiple "rings". Each TCP socket 701 maintained between the front-end 201 and a client 205 corresponds to a TCP connection buffer 702. Pre-processing 408 is performed on the TCP connection buffer data to provide, for example, data compression, encryption, and/or error correction coding before the data is placed in the corresponding TCP connection buffer 702.

When a TCP connection buffer 702 is created, it is assigned a priority. For purposes of the present invention, any algorithm or criteria may be used to assign a priority. Each priority ring is associated with a number of TCP connection buffers having similar priority. In a specific example, five priority levels are defined corresponding to five priority rings. Each priority ring is characterized by the number of connection buffers it holds (nSockets), the number of connection buffers it holds that have data waiting to be sent (nReady) and the total number of bytes of data in all the connection buffers that it holds (nBytes).

A TCP connection buffer 702 is created and placing one or more preprocessed packets from a TCP socket 701 within the TCP connection buffer 702. A TCP connection buffer 702 is sized to hold a plurality of TCP packets and each TCP connection buffer 702 is associated with a priority value. The priority value is assigned when TCP connection buffer 702 is first created and may be dynamically changed in operation.

When sending data, blender 404 performs a series of processes outlined in FIG. 6 that access data from the TCP connection buffers 702 to form TMP data units 705 that are transmitted. The processes performed by blender 404 include:

In step 602, determine the number of bytes available to be sent from each ring (nBytes), and the number of TCP connections that are ready to send (nReady)

In step 603, determine how many bytes should be sent from each ring. This is based on a weight parameter for each priority. The weight can be thought of as the number of bytes that should be sent at each priority this time through the loop.

The nSend value computed in the previous step 603 reflects the weighted proportion that each ring will have in a blended TMP packet, but the values of nSend do not reflect how many bytes need to be selected to actually empty most or all of the data waiting to be sent a single round. To do this, the nSend value is normalized to the ring having the most data waiting (e.g., nBytes=nSendNorm) in step 604. This involves a calculation of a factor: S=nBytes/(Weight*nReady) for the ring with the greatest nReady. Then, for each ring, calculate nReady*S*Weight to get the normalized value (nSendNorm) for each priority ring.

In step 605, sub-packets are sent from the different rings. This is done, for example, by taking a sub-packet from the highest priority ring and adding it to a TMP packet, then adding a sub-packet from each of the top two queues, then the top three, and so on. A variety of algorithms may be used to select particular sub-packets from the different rings to implement a desired level of fairness, prioritization, and quality of service.

Referring to step 606, within each ring, sub-packets are added round robin. When a sub-packet is added from a TCP connection buffer the ring is rotated so the next sub-packet the ring adds will come from a different TCP connection buffer. Each sub-packet can be up to 512 bytes in a particular example. If the connection buffer has less than 512 bytes waiting, the data available is added to the TMP packet.

In step 607, when a full TMP packet (roughly 1.5 kB in a particular example) is built, it is sent. This can have three or more sub packets, depending on their size. The TMP packet will also be sent when there is no more data ready.

TMP unit 405 (shown in FIG. 4) and TMP unit 505 (shown in FIG. 5) implement the TMP protocol that communicates packets between front-end 201 and back-end 203. The protocol is rides on top of universal datagram protocol (UDP) in that network devices that handle TMP packets treat them as UDP packets. However, TMP packets differ from standard UDP packets in that they have additional unique header data defining a unique set of messages, outlined below, to support the TMP functionality. Also, the manner in which TMP packets are transferred onto the physical communication channel, referred to as the protocol behavior, differs significantly from TCP.

TMP packets have a header that contains packet control information. Some TMP packets also carry extra information in a data or payload portion. The packet control information includes, for example:
  A connection number (that identifies the connection to which it belongs)
  A checksum for data integrity
  A set of flags (which may be used or remain unused) for a variety of purposes
  A message type identifier
  The confirmed message type
  The rest of the packet header contains information or data which can differ between packets, depending on the message type.

A short list of messages that can be sent by the TMP protocol includes: data, acknowledgments, connection requests and replies, time synchronization requests and replies, resent data, control messages, QoS messages, status requests and replies, suspend messages, and alerts. Packet header content which is specific to the message type is as follows.
  Acknowledgment
    The last sequential confirmed sequence message
    The confirmed message sequence number
  Time Synchronization Request
    Requester time index
  Time Synchronization Reply
    The time that the request was received
    The time that the reply was sent
    Requester time index
  Connection Request
    The connections index (zero for a new connection)
    Requested receiving port
    An additional set of flags (which may be used or unused) for a variety of purposes
  Connection Reply
    The replier's base time
    A time offset from the point of receiving the request in milliseconds
    The connections index (zero for a new connection)
    An additional set of flags (which may be used or unused) for a variety of purposes
  Data
    Data sequence number
    Time that the message was sent The rest of the packet comprises the packet body or payload portion. Alert and Acknowledge packets do not have bodies. All other packets contain bodies that carry additional information appropriate to the message itself (for example, a data packet will send the data itself).

It is important to note that alerts and QoS information are built into the protocol and do not need to be passed as data packets. Since these types of information are not built into TCP they would need to be sent as data, which might affect the application using the protocol. This means that the receiving end needs to process the packet only once to draw out the information it requires. In contrast, when QoS information is sent as a data packet in TCP, the receiving end has to process the packet as a data packet simply to get to the information that allows the alert or QoS information to be processed, which means that TCP must double the amount of processing for alerts and QoS information.

Of particular interest in the present invention, the exchange of time synchronization information 707 enables front-end 201 and back-end 203 to have a common time base and ascertain the time of issue of any received packet. While the current implementation does not include base time or time index data in the header of data packets, this information can readily be included in all message types, a subset of message types, and/or in a special message type defined for real-time data transport. In this manner, the recipient of a TMP packet knows with a high level of certainty when a received packet was transmitted, something that existing Internet protocols do not provide. In the case of TMP packets from a back-end 203 to a front-end 201, the information can be used by the front-end 201 as a factor in ordering responses to clients 205. In the case of TMP packets from a back-end 203 to a front-end 201, the information can be used by the front-end 203 as a factor in ordering responses to clients 205.

Rather than synchronizing clocks the front-end 201 and back-end 203 (i.e., absolute time synchronization), the time synchronization information 707 may indicate a differential between the clocks of the two machines (i.e., relative time synchronization). Relative time synchronization can be used substantially equivalently to information that would allow actual synchronization of the clocks. Accordingly, "time synchronization" and "time synchronized" refer inclusively to both absolute and relative time synchronization methods.

The time synchronization information 707 augments or replaces the "time to live" feature of conventional IP packets. Each IP packet specifies a time to live value that must be decremented by each router or device that handles the packet. As the time value can only be incremented in one-second units, the value becomes a hop count rather than an actual timing function. When a packet's time to live value is decremented to zero, it is discarded and must be retransmitted. In accordance with the present invention, the time to live value for TMP packets can be used more meaningfully as the recipient knows when the packet was actually sent and can set or reset the time to live value to a meaningful value when the packet leaves a front-end 201 or back-end 203.

As in all protocols, the messages in TMP have an order in which they are sent as well as particular defined situations in which they are sent. A typical TMP session might begin with a connection request. For reference, the end point that sends the connection request will be referred to as the front-end, and the receiver of the request will be referred to as the back-end, although the TMP protocol operates bi-directionally between front-ends and back-ends. The front-end 201 sends a connection request to the back-end 203, and the back-end 203 sends a connection reply back to the front-end 201. This reply will be either positive (connection accepted), or negative (connection refused). If the reply is positive, then the connection is established and the front-end and back-end can begin to exchange data.

TMP is a TCP-like protocol adapted to improve performance for multiple connections operating over a single pipe. The managed communication link or TMP link in accordance with the present invention provides a stable connection between two processes for high-speed, reliable, adaptable communication. TMP is not merely a substitute for the standard TCP environment. TMP is designed to perform particularly well in heterogeneous network environments such as the Internet. TMP connections are made less often than TCP connections. Once a TMP connection is made, it remains up unless there is some kind of direct intervention by an administrator or there is some form of connection-breaking network error. This reduces overhead associated with setting up, maintaining and tearing down connections normally associated with TCP.

Another feature of TMP is its ability to channel numerous TCP connections through a single TMP link 202. The environment in which TMP resides allows multiple TCP connections to occur at one end of the system. These TCP connections are then mapped to a single TMP connection. The TMP connection is then broken down at the other end of the TMP link 202 in order to traffic the TCP connections to their appropriate destinations. TMP includes mechanisms to ensure that each TMP connection gets enough of the available bandwidth to accommodate the multiple TCP connections that it is carrying.

Another advantage of TMP as compared to traditional protocols is the amount of information about the quality of the connection that a TMP connection conveys from one end to the other of a TMP link 202. As often happens in a network environment, each end has a great deal of information about the characteristics of the connection in one direction, but not the other. QoS information 708 is exchanged between front-end 201 and back-end 203 in accordance with the present invention. By knowing about the connection as a whole, TMP can better take advantage of the available bandwidth.

A QoS message is sent alone or may be piggybacked on a data packet. It sends information regarding the connection from one end of the connection to the other. Both front-end 201 and back-end 203 send QoS messages. The information in a QoS message is the most up to date that the sending end has. That means that if a QoS message is to be resent, the QoS information is updated before it is resent. A QoS message is identified by the message type flag QoS. In a particular implementation, a QoS message contains:

16 Bits—Average round trip time (RTT). This indicates the average round trip time as calculated by this end of the system over the last time interval, measured in milliseconds.

32 Bits—Packets Sent. This indicates the number of packets that were sent in the last time interval.

32 Bits—Packets Received. This indicates the number of packets that were received in the last time interval.

32 Bits—Packets Resent. This indicates the number of packets that needed to be resent in the last time interval.

16 Bits—Window Size. This value indicates the current window size that one end is operating under. This will allow for a random sampling of window sizes to be gathered at the other end.

16 Bits—Packets in Flight. This value indicates the current number of packets that one end has sent to the other end without receiving an acknowledgement. This will allow for a random sampling of packets in flight to be gathered by the other end.

32 Bits—Time Interval. The span of time that the information in the QOS packet is dealing with. This parameter is measured in seconds.

In this manner, both front-end 201 and back-end 203 are aware of not only their own QoS metrics, but also those of the machine with which they are communicating and their shared communication link.

As suggested in FIG. 7, QoS information 708 and time synchronization information 707 can be used by blender 404 to select the order in which data is placed into TMP data units 705. Also, QoS information 708 can be used by TMP units 405 and 505 to alter the TMP behavior.

In contrast with conventional TCP mechanisms, the behavior implemented by TMP unit 405 is constantly changing. Because TMP obtains bandwidth to host a variable number of TCP connections and because TMP is responsive to information about the variable status of the network, the behavior of TMP is preferably continuously variable. One of the primary functions of TMP is being able to act as a conduit for multiple TCP connections. As such, a single TMP connection cannot behave in the same manner as a single TCP connection. For example, imagine that a TMP connection is carrying 100 TCP connections. At this time, it loses one packet. TCP would require that the connection bandwidth be cut in half. This is a performance reduction on 100 connections instead of just on the one that lost the packet.

Each TCP connection that is passed through the TMP connection must get a fair share of the bandwidth, and should not be easily squeezed out by competing users of the available bandwidth. To allow this to happen, every TMP connection becomes more aggressive in claiming bandwidth as it accelerates. Like TCP, the bandwidth available to a particular TMP connection is measured by its window size (i.e., the number of outstanding TCP packets that have not yet been acknowledged). Bandwidth is increased by increasing the window size, and relinquished by reducing the window size. Up to protocol specified limits, each time a packet is successfully delivered and acknowledged, the window size is increased until the window size reaches a protocol specified maximum. When a packet is dropped (e.g., no acknowledge received or a resend packet response is received), the bandwidth is decreased by backing off the window size. TMP also ensures that it becomes more and more resistant to backing off (as compared to TCP) with each new TCP connection that it hosts. Further, a TMP should not go down to a window size of less than the number of TCP connections that it is hosting.

In a particular implementation, every time a TCP connection is added to (or removed from) what is being passed through the TMP connection, the TMP connection behavior is altered. It is this adaptation that ensures successful connections using TMP. Through the use of the adaptive algorithms discussed above, TMP is able to adapt the amount of bandwidth that it uses. When a new TCP connection is added to the TMP connection, the TMP connection becomes more aggressive to accommodate it. When a TCP connection is removed from the TMP connection, the TMP connection becomes less aggressive.

TMP link 202 provides improved performance in its environment as compared to conventional TCP channels, but it is recognized that TMP link 202 resides on the Internet in the preferred implementations. Hence, TMP must live together with many protocols and share the pipe efficiently in order to allow the other protocols fair access to the shared communication bandwidth. Since TMP takes only the amount of bandwidth that is appropriate for the number of TCP connections that it is hosting (and since it monitors the connection and controls the number of packets that it puts on the line), TMP will exist cooperatively with TCP traffic. Furthermore, since TMP does a better job at connection monitoring than TCP, TMP is better suited to throughput and bandwidth management than TCP.

FIG. 8 illustrates an exemplary set of processes 808 implemented by pre-processing units 408 and 508. Some, none, or all processes illustrated in FIG. 8 may be implemented on particular packets as described hereinbefore. Unprocessed payload 801 from a payload portion of a packet are passed to processes 808 that perform encryption, compression, and/or error correction. The actual algorithms used to implement encryption, compression and/or error correction in any specific implementation are a design choice made be to meet the needs of a particular application. Error correction is preferably forward error correction that adds redundant data to the pre-processed payload so that a recipient can reconstruct the payload portion in the presence of one or more transmission errors. The amount and format of redundant information can be varied dynamically to account for current QoS conditions as reported by, for example, QoS information 708.

FIG. 9 illustrates an exemplary set of processes implemented by post-processing units 407 and 507. Some, none, or all processes illustrated in FIG. 9 may be implemented on particular packets depending on the corresponding pre-processing performed on the packets. Pre-processed packets are passed to processes that perform decryption, decompression, and/or error correction decoding. The actual algorithms used in any specific implementation are determined to complement the pre-processing processes. Error correction operates to detect one or more transmission errors, determine if the detected errors are correctable, and when correctable, reforming the corrected payload. Payload portion 903 is essentially a fully-formed payload portion of, for example, an HTTP packet.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, while devices supporting HTTP data traffic are used in the examples, the HTTP devices may be replaced or augmented to support other public and proprietary protocols and languages including FTP, NNTP, SMTP, SQL and the like. In such implementations the front-end 201 and/or back-end 203 are modified to implement the desired protocol. Moreover, front-end 201 and back-end 203 may support different protocols and languages such that the front-end 201 supports, for example, HTTP traffic with a client and the back-end supports a DBMS protocol such as SQL. Such implementations not only provide the advantages of the present invention, but also enable a client to access a rich set of network resources with minimal client software.

Figure 20:
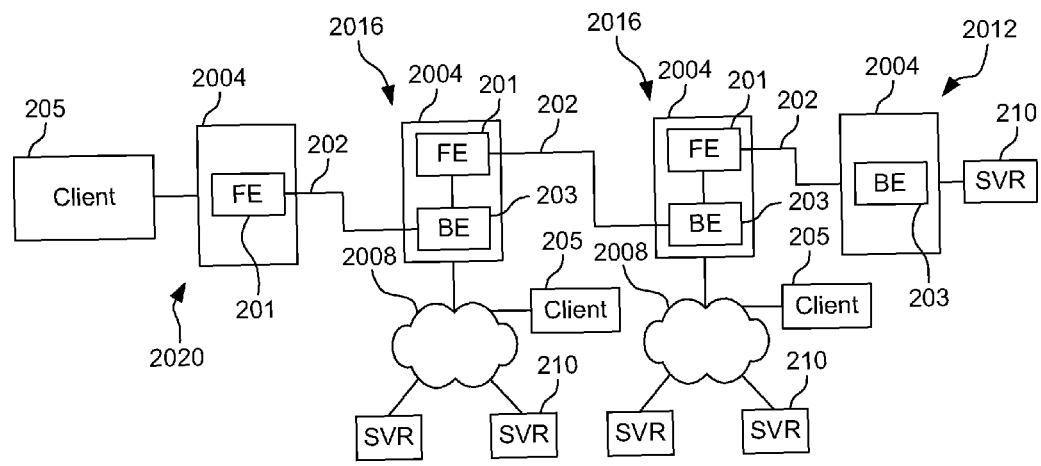
FIG. 20 illustrates an exemplary daisy chain for communication of network traffic.

In one or more embodiments, multiple front and back ends may be used to form one or more communications channels or paths for TMP packets. Such configurations will be referred to herein as daisy chain configurations. FIG. 20 illustrates an exemplary daisy chain comprising a variety of network devices. A first chaining node 2020 having a front-end 201 and a second chaining node 2012 having back-end 203 are at the "ends" of the daisy chain. As shown, a client 205 may be connected to the front-end 201 and a server 210 connected to the back-end 203. Between the ends of the daisy chain may be one or more intermediary chaining nodes 2016.

As can be seen, a chaining node 2004 may comprise either or both a front-end mechanism 201 and a back-end mechanism 203. It will be understood that the first chaining node 2020 and the second chaining node 2012 may respectively be a stand-alone front-end and back-end, in some embodiments. Though not shown, it is noted that the front-ends 201 and back-ends 203 may be respectively connected to one or more front-end managers and back-end managers such as described above.

It can be seen that the front-end 201 and back-end 203 allow a chaining node 2004 to connect to a front-end or back-end of another network device, such as another chaining node, or to a stand alone front-end 201 or a stand alone back-end 203. It can also be seen that the chaining node 2004 may be connected to a local network 2008 having one or more clients 205 and servers 210. In this manner, a chaining node 2004 may function as a network junction that allows traffic to travel between the daisy chain and a local network 2008.

Though, as used herein, local network 2008, refers to a local area network (LAN), it is noted that any network or sub-network may be connected to a chaining node 2004 such as in the manner shown in FIG. 20. In one or more embodiments, the local network 2008 may be a LAN such as a corporate or other LAN having one or more servers, clients, or both. Though not shown, it will be understood that the local network 2008 may also have other connections to other networks such as other LANs, WANs, or the Internet. In these embodiments, the local network 2008 may be accessible through the daisy chain or through one of these other connections. However, as will be described below, connecting to the local network 2008 through the daisy chain provides several advantages in a variety of situations.

It is noted that clients 205, servers 210, or other devices of a local network 2008 may connect to the front-end 201, back-end 203, or both of a chaining node 2004. For example, clients 205 of the local network 2008 may connect to the front-end 201 of the first chaining node 2020, while servers 210 of the local network connect to the back-end 203 of the second chaining node 2012. Of course, clients 205 or servers

210 may also or alternatively connect to one or more other chaining nodes 2004, such as the intermediary chaining nodes 2016.

The connections between the front-ends 201 and back-ends 203 of the daisy chain may be one or more TMP links 202. These connections may be thought of as segments of a communications channel or link along the daisy chain. Because the daisy chain may have segments which are TMP links 202, the advantages of the TMP protocol are available across the daisy chain which may include a plurality of chaining nodes 2004 (such as shown) as well as a plurality of local networks 2008 having various combinations of clients 205 and servers 210. In this manner, a myriad of connections may be made through one or more segments or TMP links 202 of the daisy chain. For example, the client 205 connected to the first chaining node 2020 may connect to the server 210 connected to the second chaining node 2012 or to one or more of the servers in a local network 2008 connected to the intermediary chaining nodes 2016 via one or more segments of the daisy chain. The client 205 may then request services or data from various servers 210 via the daisy chain. For example, a client 205 may make database queries to the servers 210 of one local network and make web or HTTP requests to servers of the same or a different local network. The client 205 may be located inside or outside the one or more local networks 2008 as can be seen by FIG. 20.

As is known, access to certain servers 210 may be restricted for security or other reasons. For example, an organization may configure internal database servers such that they are only accessible through the organization's own network. Thus, a client 205 on the same local network 2008 as the database server 210 may access the server, however, other clients may not have access to the server. While this increases security it may also be debilitating to administrators or other users who require remote access to the database or who may be at geographically distant parts of the organization's network.

The daisy chain may be used in one or more embodiments, to extend connectivity to servers 210 from users or clients 205 at various locations. For example, the daisy chain may be used to extend a private network to include one or more local networks through one or more chaining nodes 2004. Because the TMP link 202 may provide encryption and other security services as well as accelerated communications, in effect, the daisy chain allows a client 205 to appear to be within a server's 210 local network 2008 even though the client may actually be remote from the server.

Clients 205, servers 210, or both may be continuously or periodically connected to the daisy chain. For example, all data traffic of a local network 2008 may be routed to a chaining node 2004 to provide a persistent or continuous connection to the daisy chain. In this situation, the local network 2008 may only be capable of external communication through the daisy chain. This is beneficial in a variety of ways. For security, communication is limited to network devices connected to the daisy chain. For efficiency, the local network 2008 in this configuration only utilizes TMP links 202 to communicate. The TMP links 202, as stated above, provide accelerated communication even on reduced bandwidth or congested links. To illustrate, a remote local network 2008 having a limited bandwidth external connection may benefit from having all (or some) of its data traffic being sent through the TMP links 202 of the daisy chain.

Periodic connections may be made automatically or when desired. For example, upon the detection of particular network conditions, a client 205 or server 210 may automatically direct packets through one or more TMP links 202 of the daisy chain. The automatic start/stop feature will be described further below. In some embodiments, packets may be automatically sent through a segment of the daisy chain based on the destination address or other characteristic of the packets, or if the segment provides increased performance over other communication links. In other embodiments, a user may manually initiate a connection through the daisy chain or manually configure his or her network device (e.g. client) to redirect some or all data packets through the daisy chain.

Data traffic may be routed through the daisy chain in a variety of ways. In one embodiment, front-ends 201, back-ends 203 or both maintain routing information. For example, a routing table may be maintained and used to route packets through the daisy chain. In one embodiment, packets may be routed through the daisy chain based on their destination address according to one or more routing schemes now known or later developed. The routing information may include routing information for one or more local networks 2008 connected to the daisy chain by one or more chaining nodes 2004. In this manner, traffic may be correctly routed between sources and destinations within or connected to the local networks 2008.

Figure 21:
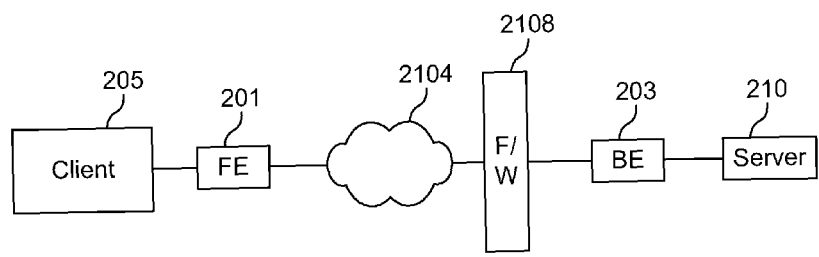
FIG. 21 illustrates an exemplary configuration of a front-end and back-end when communicating through a firewall.

In some networks, a back-end 203 and one or more servers 210 may be behind a firewall. This is illustrated by FIG. 21. In such configurations, the server 210 may have an internal address which is not publicly accessible from an external network 2104. Data packets from a client 205 may be addressed to a firewall 2108, back-end 203, or gateway which has a publicly accessible address. In this situation, the destination address in one or more packets received by the back-end 203 behind the firewall 2108 does not match the actual address of the intended destination or server 210.

To address this issue, the back-end 203 may be configured to redirect data packets to their intended destination. For example, data packets having a particular destination port may be redirected to a server 210 based on the destination port number. This allows packets addressed to a back-end 203 to be properly routed to an appropriate server 210. For instance, packets received by the back-end 203 having destination port 80 may be redirected to one or more web servers. It is noted that the firewall 2408 may redirect packets to the back-end 203 according to one or more rules. Alternatively, the firewall 2408 may permit direct communication with the back-end 203, in one or more embodiments.

Of course, packets may be redirected by a back-end 203 according to various criteria. For example, the source address, source port, or both may be used to determine which server 210 to redirect a packet to. In addition, the destination address, destination port, or both may be used to determine which server 210 to redirect the packet to. It is contemplated that a range of addresses, ports, or both may be redirected to one or more servers 210. The back-end 203 may also provide a new destination port for a packet in one or more embodiments. For example, an incoming packet having a destination port 56 may be redirected to port 80 on a server 210. In addition, the priority of packets may be set during redirection. For example, packets from or to a particular address, port, or both may be given priority over other packets.

It is contemplated that a network device may start and stop sending data through a TMP link 202 automatically in one or more embodiments. For example, a front-end may direct traffic through a TMP link 202 based on certain observed network conditions. It is noted that if a TMP link 202 does not exist, a TMP link may be created such as described herein and traffic may then be automatically directed to the newly created TMP link.

This automatic start/stop feature is beneficial in that it gives users the ability to automatically send traffic through a TMP link 202 when network conditions are less than optimal. For example, in one embodiment, data traffic may be automatically sent through a TMP link 202 only when network conditions degrade to a point where TCP no longer functions efficiently. The automatic start/stop feature may also automatically stops sending traffic through the TMP link 202 when network conditions improve. To illustrate, in the above example, communication may revert back to a TCP link when network conditions are restored to a normal state. In this manner, the TMP link 202 provides an alternate link for data to reach its destination.

The automatic start/stop feature may also direct traffic to a TMP link 202 for other reasons other than network conditions. For example, traffic from a particular application or of a particular protocol may be directed through a TMP link 202. As another example, traffic intended for a particular destination (such as an internal server) may be directed through a TMP link 202.

Figure 22:
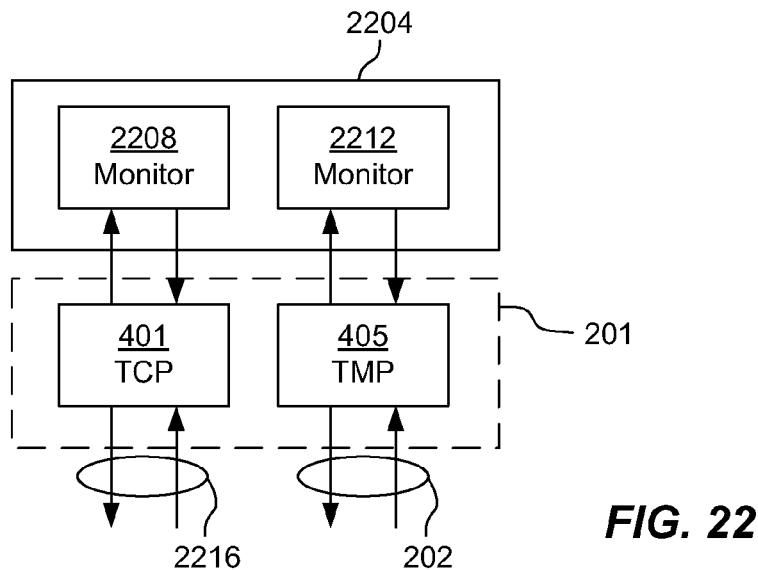
FIG. 22 illustrates and exemplary automator.

FIG. 22 illustrates an automator 2204 which embodies the automatic start/stop feature. The automator 2204 may be a component of a front-end or back-end, such as the front and back-ends described above, or the automator may be a separate component. For example, the embodiment shown in FIG. 22, the automator 2204 is a component of a front-end 201. The automator 2204 may also be part of or implemented in a client, server, router, or other network device. Thus, a variety of network devices may automatically direct traffic through a TMP link 202. In one or more embodiments, the automator 2204 may be implemented as machine readable code or one or more instructions stored on a memory device or hard wired into a hardware component, such as a processor of a network device. In the case of a front-end, the automator 2204 may be implemented as part of a TMP redirector driver in one or more embodiments. Of course, the automator 2204 may be a separate component of an front-end as well.

The automator 2204 may comprise one or more monitors to track operating characteristics or other characteristics of one or more communication links or segments. For example, as shown the automator 2204 comprises a TCP monitor 2208 and TMP monitor 2212 to track individual TCP link(s) 2216 and TMP link(s) 202 and observe the round trip times (RTT) of individual packets, as well as the number of duplicate packets (packet loss) that occur for each connection during a given period of time. Of course, other types of communication links and other operating characteristics may be tracked as well. For example, a monitor may track a link's bandwidth, latency, reliability, error rate, congestion, or a combination thereof. Operating characteristics of a plurality of links may then be compared. In one or more embodiments, where a TMP link 202 provides (or would provide) an optimal communication path, the automator 2204 may automatically cause traffic to be sent through the TMP link 202. Otherwise, traffic may continue to be sent through a standard link, such as a TCP link 2216.

In some embodiments, one or more links may be compared to a theoretical TMP link having one or more predetermined operating characteristics. For this reason, a TMP monitor 2212 may not be provided in all embodiments. The predetermined operating characteristics may be stored in a memory device accessible to the automator 2204, and may be set to various values as desired by the user. In this case, if the theoretical TMP link provides an optimal communication path and an actual TMP does not yet exist, a new TMP link may be created and used. Of course, if an actual TMP link already exists, it may be used.

The TMP link may be considered to provide an optimal communication path when it provides improvements or benefits as compared to one or more other available communication links. In general, a TMP link will be optimal if it has one or more operating characteristics superior to those of other communication links. For example, the TMP link may be the optimal communication path if its operating characteristics such as the filtered RTT (round trip time) and duplicate packet ratio (i.e. the number of duplicate packets over the number of total packets for a given sampling period) are superior when compared to the filtered RTT and duplicate packet ratio of other communication links. Of course, other operating characteristics may be similarly compared. For example, an optimal communication link may be one having a higher bandwidth than that of other communication links. As another example, an optimal communication link may be one having a lower cost or lower number of segments from a source to a destination and vice versa.

It is noted that the optimal communication path may differ based on the type of communication that will travel through the path. For example, communications that require low latency may have an optimal communication path of reduced bandwidth as long as the latency is low. As another example, communications requiring high bandwidth may have an optimal communication path of increased latency as long as there is high bandwidth.

One or more calculations or algorithms may be applied in determining the optimal communication path. For example, in one embodiment a smooth RTT may be calculated in a two stage process where each connection's filtered RTT is calculated at a first stage, and where each filtered RTT is combined together resulting in the smooth RTT at a second stage. By filtering the RTT twice to produce the smooth RTT, the effect of anomalies, such as where the RTT spikes or dips for a brief period of time but is not indicative of the overall quality of the link, is reduced or eliminated. The smooth RTT may then be used to determine if the TMP link is optimal and whether or not it should be used. The formula for calculating the filtered RTT is as follows: filtered RTT=in traffic shaping. The filtered RTT, smooth RTT or both may then be used to determine an optimal communication path, such as by a comparison between the RTT values of a TMP link and other communication links.

Figure 23:
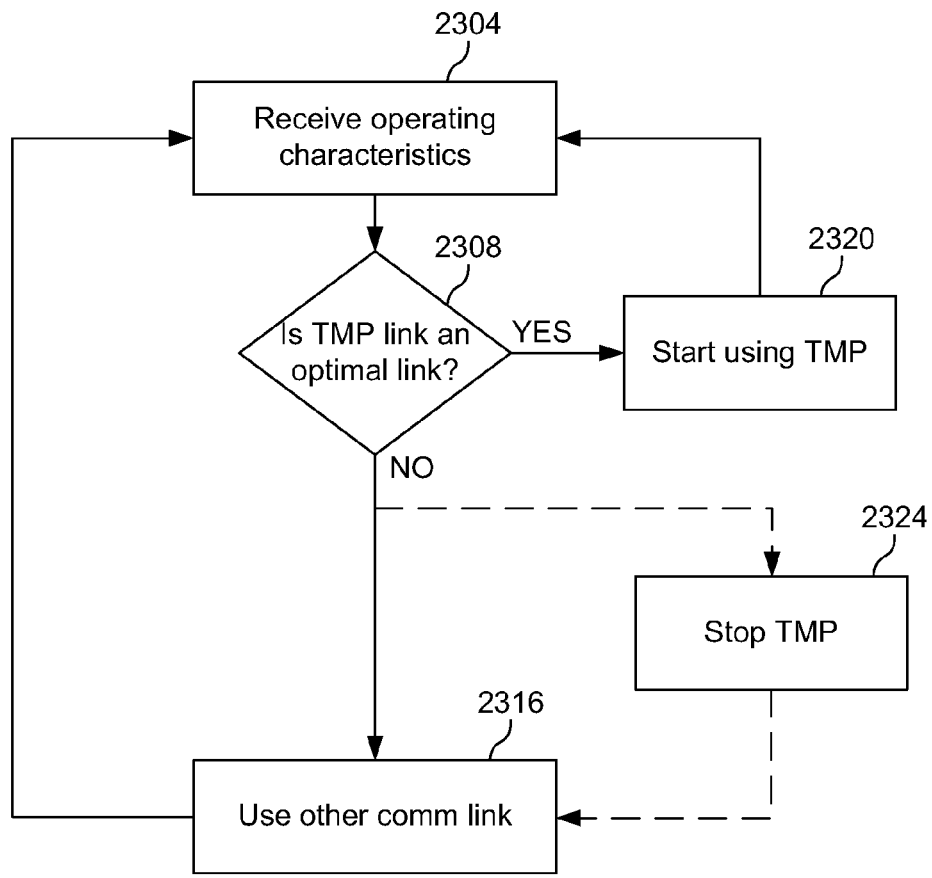
FIG. 23 illustrates in flow-diagram form exemplary processes involved in automatically starting and stopping a TMP link.

FIG. 23 is a flow diagram illustrating operation of an exemplary automator. At a step 2304, operating characteristics for a communication link may be received by a monitor of the automator. Operating characteristics of the communication link may then be compared to one or more operating characteristics of an actual or theoretical TMP link at a decision step 2308 to determine if a TMP link is the optimal communication path. For example, the latency, bandwidth, congestion, and/or RTT of a TCP or other communication link may be compared to the latency bandwidth, congestion, and/or RTT of the TMP link.

If a comparison of the communication link's and the TMP link's operating characteristics of the TMP link indicate the TMP link is the optimal link, the automator may begin directing data traffic through a TMP link at a step 2320. If no TMP link exists, one may be created. For instance, if the bandwidth of a communication link is below that of the TMP link, the automator may automatically direct data traffic through the TMP link instead of the communication link. Individual operating characteristics may be compared to determine the optimal communication link or multiple operating characteristics may be compared. As stated, the operating characteristics to be compared may be selected based on the type of data traffic (e.g. high bandwidth, low latency, etc. . . . ) being communicated.

If the operating characteristics are no longer favorable, it may be determined that use of the TMP link is no longer necessary. As such, because use of the TMP link is no longer desired or necessary, the automator may begin sending traffic through the non-TMP communication link at a step 2316. Optionally, the automator may stop or deactivate the TMP link at a step 2324.

An additional aspect of the invention is route awareness. As used to herein, route awareness refers to "awareness" of the one or more routes or paths data packets will follow through a network to their destination. For example, enhanced or other clients, front-end mechanisms, back-end mechanisms, or other network devices capable of predicting or otherwise knowing the one or more routes their data packets will follow may be considered route aware. In one or more embodiments, a route monitoring system as described below may be used to collect, process, and provide route information to network devices, making them route aware. As will be described further below, due to the distributed nature and vagaries of networks such as the Internet route awareness is highly advantageous, especially in increasing the speed and reliability of communications.

In one or more embodiments, route aware clients, front-end mechanisms, back-end mechanisms, or other network devices may utilize this awareness in combination with a TMP link. In this manner, the cooperative actions between clients, back-end mechanisms, and front-end mechanisms which implement TMP links may act according to awareness of the one or more routes a packet may follow to its destination. For instance, particular routes may have certain attributes or characteristics as a result of their underlying hardware, communications protocols, level of congestion, or bandwidth, among other things. Route awareness may thus be advantageously used to tune or alter the behavior of a TMP link according to the attributes or characteristics that the link's TMP packets will follow through a network. In addition, route awareness may also be used to determine whether or not traffic should be directed through a TMP link or other communication links. As will become apparent from the discussion below, route awareness also provides several additional advantages.

As is known, the Internet is a global network that consists of multiple interconnected smaller networks. In general, routing protocols are used to disseminate information that allows distributed decisions to be made on how best to forward packets towards their destination through one or more networks.

Internet routing protocols can be divided into intra-domain and inter-domain protocols, with inter-domain protocols communicating information between networks, while intra-domain protocols are responsible for determining the forwarding of packets within each network. This general architecture and the associated suite of protocols are rapidly becoming the de facto technology on which modern communication networks are built. This dominance extends from simple local area networks to large-scale, international carrier networks, and is largely due to the robustness and efficiency of networks built using it. In particular, IP networks are often referred to as "connectionless", and the delivery of data packets to their intended destination is performed through a number of "independent" decisions made by the routers to which a packet is being forwarded.

Figure 10:
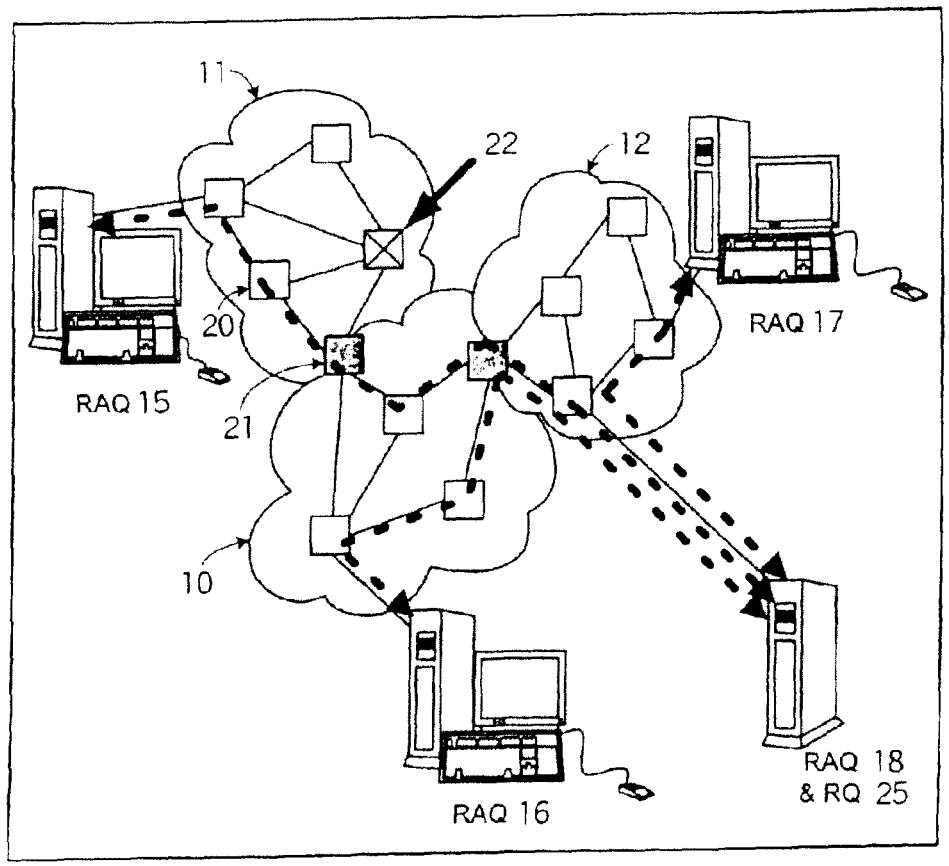
FIG. 10 illustrates an exemplary routing domain, where the present invention may be applied.

FIG. 10 illustrates an exemplary network having a routing domain, where the present route monitoring system and its various modules may be applied. The domain illustrated in FIG. 10 is not, of course, the only domain configuration in which the invention may apply, but it is only intended to serve as an illustration of one possible domain. Referring to FIG. 10, the illustrated network includes three areas 10, 11, and 12. The route monitoring system may also be used with a network having more than three or fewer than three areas. The network such preferably follows a link state routing protocol such as open shortest path first (OSPF) or ISIS. Each area typically includes a plurality of routers such as 20, 21, and 22 that direct and transport packet traffic between each other within each area, as well as to and from external routers in other areas. These may include: (1) area routers 20 that route information to and from other routers that are associated with a single area; (2) border routers 21 which serve as routers for two or more areas within the network and provide for the passage of traffic from one area 11 to another area 10 and vice-versa; and (3) boundary routers 22, which serve as exit and/or entry points to and from the network.

In accordance with the present invention, the route monitoring system may include one or more Route Acquisition (RAQ) modules 15, 16, and 17. Typically, there is one RAQ module for each area of the network, although it is possible that an area may have no RAQ module or more than one RAQ module. The RAQ modules, which preferably have the features of a routing device, essentially serve as "stub-routers" and participate in the routing protocol of their respective area. This allows them to receive much or all of the routing information exchanged between routers in their area. In the context of a link state protocol, this information provides detailed background about the internal topology of the area, the set of addresses associated with the different routers in the area and the current state of various network nodes and interfaces. It may also provide summarized information regarding destinations in other areas and outside the network, or how to reach them.

The exact structure and specification of the information received by the RAQ module depends on the routing protocol in use, but a key feature is that it provides information about the "cost" of reaching local destinations inside the area, as well as remote destinations through different "exit" points from the area. The "cost" refers to the distance that a packet must travel to reach a destination from a starting point. The cost may be directly related to a number of "hops" between routers. For example, referring to area 11 in FIG. 10, if the cost of traveling between each router were, for example, one, then the cost for a packet to travel from RAQ module 15 to router 21 via router 20 would be two, since it takes two "hops" to reach the destination: a first hop to router 20 and a second hop to router 21. Alternatively, if the cost of the link between router 21 and router 20 were, for example, three, then the total cost for the packet to travel from RAQ module 15 to router 21 through router 20 would be one plus three, which is four.

The route monitoring system may also include a Route Aggregation (RAG) module 18. One RAG module is the default configuration, but more than one RAG module is a possible option. The RAG module 18 receives and processes the information obtained by the RAQ modules, and is described in more detail below. The RAG module 18 may be any computing device, such as a PC, laptop, server, or individual work station having a processor and memory.

The RAG module 18 is in substantially constant communication with many, and preferably all, of the RAQ modules in the different areas of its network. The RAG module receives from the RAQ modules the routing information that the RAQ modules have acquired through participating in the routing protocol of their individual area. The RAG module parses and processes this information to support the extraction of end-to-end (across the network) path information, even across multiple areas. Thus, the RAG module performs a key function, as the routing information from individual routers typically only provides local path information specific to individual areas. The RAG module structures the routing information associated with different areas so as to facilitate its piecing together to create end-to-end paths in response to route queries.

The RAG module 18 includes a component referred to herein as the route storage sub-module (or, more briefly, the "storage module"). The storage module maintains information gathered by the RAG from the RAQs, both current and historical. Thus, the storage module is preferably sufficient to store a large quantity of information received from the RAQ modules. However, RAGs with smaller memory amounts can be used. When stored, historical information can be stored in raw (i.e., unprocessed) form or supplemented with one or more indices, tables, and/or summaries to enable rapid retrieval of historical state. This information can be used for both a playback, or path analysis, function and a play-forward, or predictive, function, each of which is described in more detail below.

The route monitoring system may also include at least one Route Query (RQ) module 25 that serves as an interface for a user, such as a network administrator, to retrieve information collected by the RAG module. The RQ module 25 may be a separate device, such as a computing device having an input/output port or communications port, or it may be co-located with another device. For example, FIG. 10 illustrates the RAG module 18 and the RQ module 25 as being installed on a single computing device. In fact, any or all of the modules described above can be considered functional units, and two or more of them may be co-located in the same physical device.

The RQ module 25 interfaces to the RAG module 18 and coordinates the process of retrieving complete path information from the data structures maintained by the storage module. The RQ module 25 accepts as inputs an identifier for the starting point within the network for a path or route that is to be retrieved, and an identifier for the end point or destination for the path. The identifier of the starting point can be a host name or IP address local to the network, i.e., belonging to one of the subnets in the network, or be in the form of an interface number belonging to one of the routers in the network, i.e., identifying the entry point into the network. The identifier of the desired end-point or destination will typically be in the form of a host name or IP address, and need not be associated with a device that is local to the network. In the case of a remote end-point, the path information that is returned extends from the (local) entry point in the network to the exit point from the network towards the next network that is to be used in order to reach the remote destination.

Optionally, the RQ module 25 may also accept a time parameter to identify whether the information to be provided is a playback (i.e., analysis of a path previously traveled) or play-forward (i.e., predictive) response. For the play-forward embodiment, the RQ module may also accept additional events pertaining to "what-if" scenarios. The optional time parameter (which typically is coordinated with or relates to a clock associated with the RAG module) would identify the time at which state dynamics are sought to be represented. If the time indicated is in the future, additional events, identified as a sequence of (time, network element, state) may be accepted as input by the RQ.

It is contemplated that an RQ module 25 may also provide centralized administration and configuration for various components of the route monitoring system. For example, the RQ module 25 may be used to remotely configure and update RAG modules, RAQ modules, or both, such as by updating configuration information stored in or otherwise associated with the modules. In this manner, the RQ module 25 may function as a management module or component for remote administration and configuration. It is noted that the RQ module 25 may also be used for administration and configuration of front-ends and back-ends, such as described above with regard to front-end managers and back-end managers. In addition, the front-end managers and/or back-end managers may likewise perform remote administration and configuration of the route monitoring system.

As mentioned above, a RAQ module essentially serves the function of a "stub-router" that participates in the routing protocol of its own area. There will typically be one RAQ per area, although more than one could be deployed for redundancy purposes. In the context of a link state routing protocol, topology (i.e., structure of an area such as router addresses and cost between routers) and route information is flooded through each area, so that each router acquires a complete topological real-time map of its area and of the location of route entries. In addition, in each area, routers connected to other areas or other networks, i.e., border routers (21 on FIG. 10) and/or boundary routers (22 on FIG. 10) also flood within each of their areas information regarding their ability to reach route entries that lie outside the area. The information may be as simple as stating that they can reach destinations in other areas (as would be the case in a domain following the ISIS protocol), or it may include the identity of the routing entries they have learned, the cost associated with reaching those routes when going through them, and/or other information items (as would be the case in a domain following the OSPF protocol). Routers inside an area use this information to determine how to forward packets along shortest paths towards the route entry that matches the packets' destination address.

Figure 11:
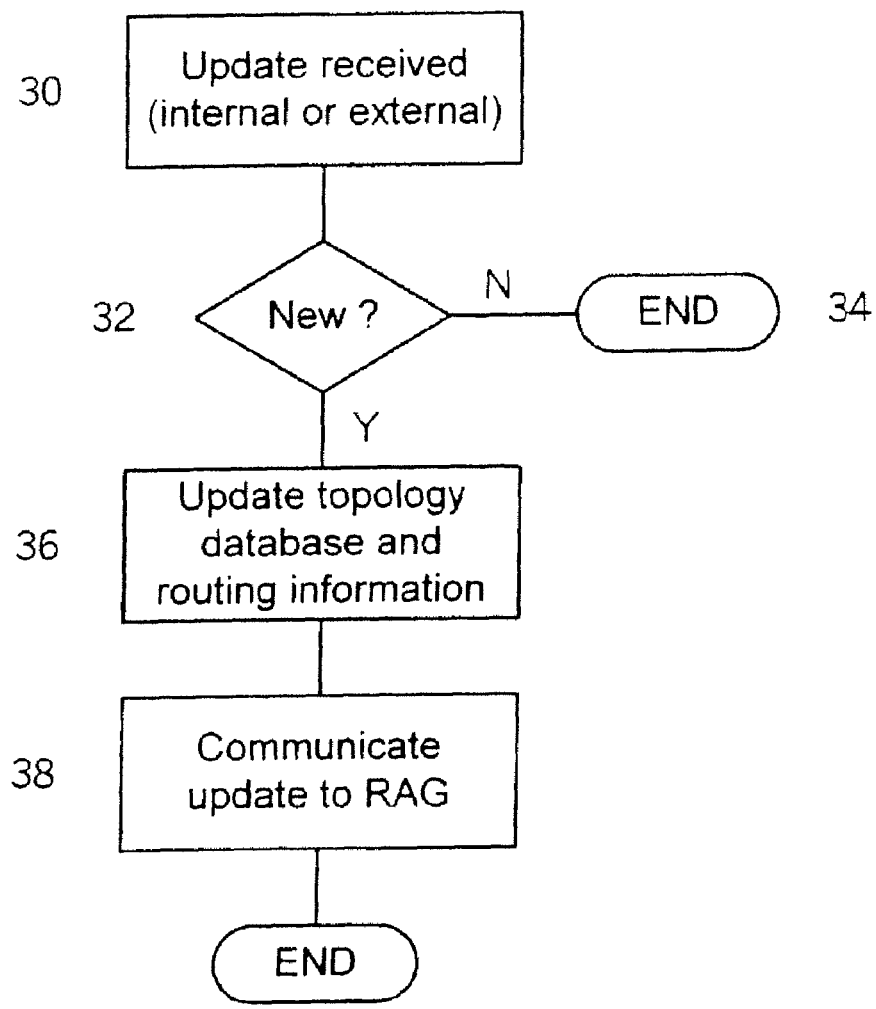
FIG. 11 illustrates exemplary steps that may be performed by a route acquisition module to gather topology information from an individual area in accordance with the present invention.

FIG. 11 illustrates exemplary steps performed by a RAQ module in accordance with the present invention. Referring to FIG. 11, as a result of participation in the flooding process, each RAQ module receives all updates pertaining to changes in routing and topology information (step 30). The RAQ is then responsible for making that information available to the RAG. Specifically, the RAQ receives information transmitted by its neighboring routers within the area and uses that information to build a topology database. Preferably, when updates are received that pertain to a topology element such as a router, a link and its cost, local route entries reachable from each router, and/or (for routers providing connectivity to other areas or routing domains) information regarding the reachability of remote route entries, the RAQ module checks the topology database to determine whether the information is new (step 32). If the information is not new, the RAQ module does nothing with the information (step 34) and watches for additional information (repeating step 32). If the update corresponds to new information, then the RAQ module updates its topology database with the new information (step 36), and it also forwards the updated or new information to the RAG module (step 38). The RAG module maintains a global topology database that contains information received from all RAQ modules in the network with which it communicates.

In addition to changes caused by the receipt of an update from one of the RAQ's neighboring routers, there are other events that can affect the routing and topology information maintained by the RAQ. In particular, most link state routing protocols include various timer based "liveness" mechanisms to detect failures and remove out-of-date information from the topology database. The expiration of one such timer triggers the removal of a corresponding piece of information from the topology database. Such a change also needs to be reported to the RAG to ensure that its information is consistent with that maintained by the RAQ. In other words, the RAQ acting as a router maintains an up-to-date view of routing and topology information in its own area, and is responsible for ensuring that this information is conveyed to the RAG in a timely and reliable manner.

The topology database that the RAQ module builds provides it with substantially complete knowledge about routers and links (and their cost) in the RAQ module's own area, as well as possibly route entries reachable within and outside its own area or the identity of routers capable of reaching remote entries.

As noted above, the RAQ module is preferably any type of routing device that may be commonly found or used in the network or in a comparable network. In accordance with a preferred embodiment of the present invention, the RAQ module is not required to forward transit data. As a result, although it functionally appears as full-fledged router, the particular RAQ module used optionally can be one of relatively low-end technology.

Referring back to FIG. 10, the RAG module 18 collects and manages information assembled from the various RAQ modules 15, 16, and 17 into a form that is easily queried by the RQ module 25. There is typically one RAG per network or routing domain, although a single RAG could be shared across multiple domains, and alternatively multiple RAGs could be used within the same domain for redundancy purposes. For simplicity, the preferred embodiment described herein assumes that there is one RAG serving a given routing domain. The RAG maintains a number of data structures used to store and organize the information it receives from RAQs in different areas.

Figure 12:
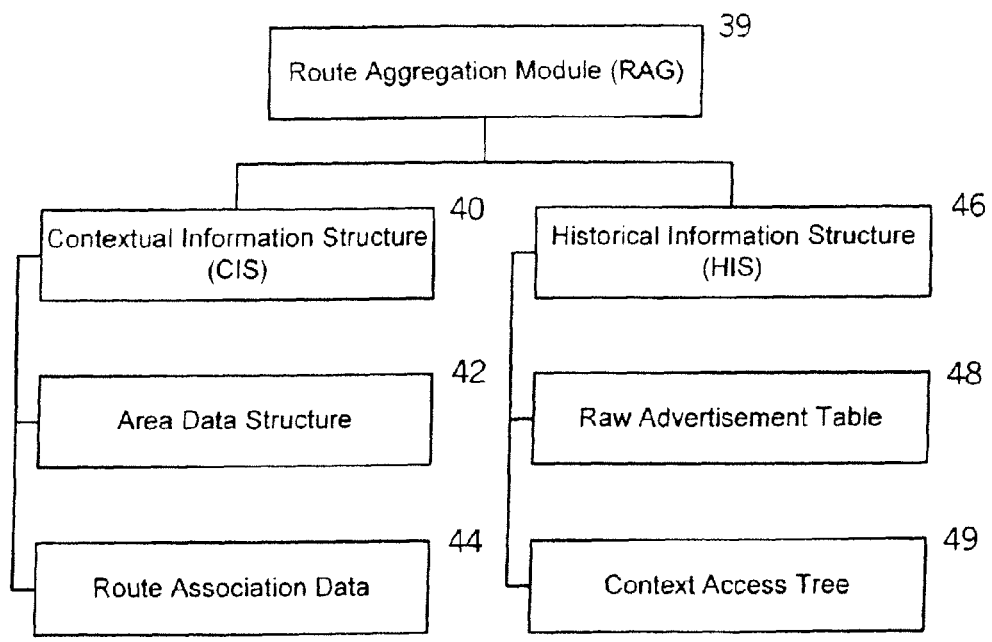
FIG. 12 illustrates the types of information and memory areas that may be allocated by a route aggregation module.

FIG. 12 illustrates the preferred types of information that may be received and memory areas that may be allocated by the RAG module. The RAG 39 maintains at least two sections or types of memory. The information includes two types of contexts. One context corresponds to the current routing domain state, while others are associated with past routing states. The first type, a Contextual Information Structure (CIS) 40, represents a snapshot of the routing state of the network at a particular instant, and can be searched to provide end-to-end (through the routing domain) path information in response to queries placed by the RQ module. The past routing states, together with raw-data received from the RAQs, processed event indices, and other structures pertaining to the past dynamics of the network, make up the historical information that the RAG maintains in the second type of memory, a historical information structure (HIS) 46.

The RAG module has two roles. In its downward-facing (or network-inward) role, it communicates with the RAQs and assembles the updates that it receives from the RAQs. In its upward-facing (or network-outward) role, the RAG module creates and deletes CISs in response to requests from the RQ module.

Each CIS includes at least one, and preferably several, several area data structures (ADS) 42, each with a corresponding route association data (RAD) structure 44. The CIS pieces together information received from different RAQ modules so that the information can be searched to provide end-to-end (through the routing domain or network) path information in response to queries placed by the RQ module. This piecing together is achieved through a topology map that identifies how the different area data structures are linked together in the network. Each ADS is essentially a replica of the area's topology database constructed in a manner essentially similar to how routers construct their own area topology database. This is made possible by the fact that the RAQs ensure that any update they receive is communicated to the RAG. In other words, the RAG receives all relevant updates from each area and uses them to reproduce the area topology databases that are separately maintained in each area by the RAQ for the area. Each topology database contains a list of all the routers in the area together with their links and networks, as well as adjacencies, i.e., the set of routers reachable through a given link or network. The information available from an area database allows the computation of shortest paths between any pairs of routers or interfaces in the area.

The ability to associate those shortest paths with route entries, and therefore destination addresses, is provided through the RAD structure 44. The RAD 44 is similar to the routing table that is maintained by each router, with the difference that instead of storing the set of next hops associated with the shortest paths computed by the router for each routing entry, the information that is kept is the identity of the router from which the route was learned. A primary function of the RAD is to maintain knowledge of which router a given route entry is associated with. A route entry is said to be associated with a router if the router is one that "advertised" reachability to the route entry.

Figure 13:
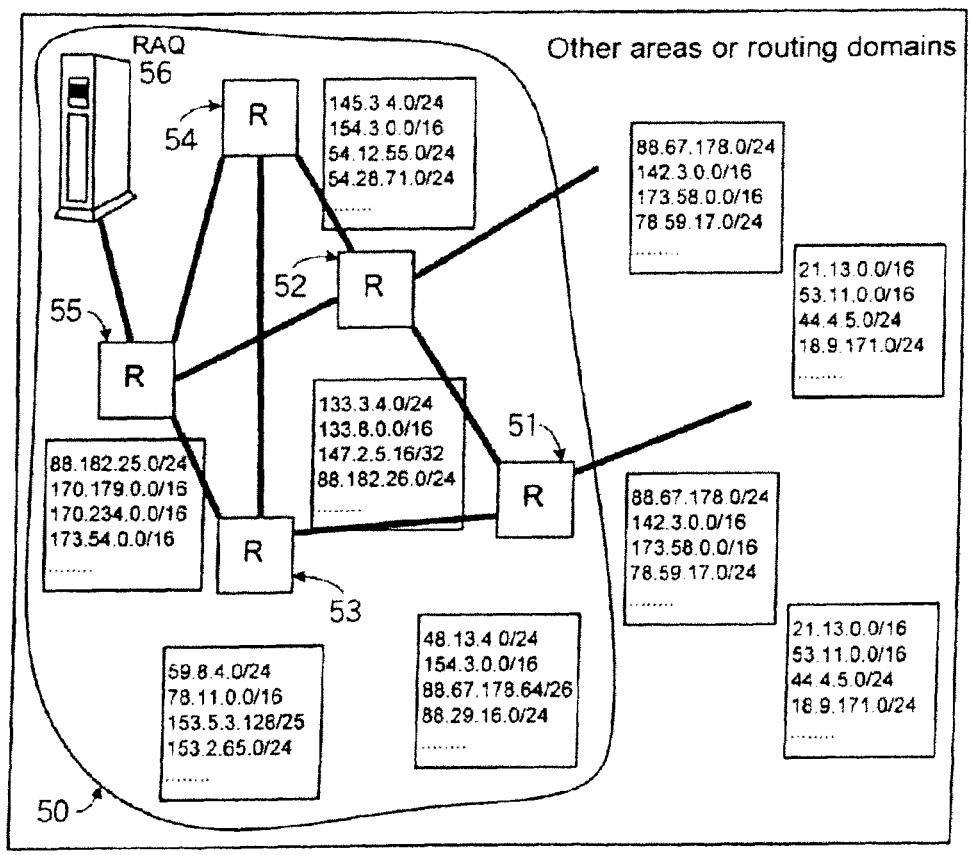
FIG. 13 illustrates the address information that may be used in order to identify specific routers, entry points, and/or exit points in an area.

The concept of advertising a route is illustrated in embodiment shown in FIG. 13, which illustrates an expanded version of a single area 50. Referring to FIG. 13, each router is associated with, or "advertises," a list of routes that are reachable from the router. For example, router 51 advertises both: (1) "area internal" routes, or routes associated with networks directly reachable from the router; and (2) "area external" routes, or, routes associated with networks located in other areas or routing domains. Route entry 48.13.4.0/24, which is advertised by router 51, is an example of an area internal route. Route entry 173.58.0.0/16, also advertised by router 51, is an example of an area external route. Note that association of a router with an area external route does not necessarily require an explicit advertising by the router that it can reach the route entry. It is possible for such an association to be implicit, i.e., the router is known to be associated with area external route entries. The RAD consists of a binary tree structure, such as a Patricia Trie (see FIG. 14) or an Adelson-Velskii-Landis (AVL) binary tree, that is commonly used in routers to allow the searching of route entries and retrieval of the entry that provides the longest prefix match for a given destination address.

As with the building of individual area topology databases shown in FIG. 11, the RAD is built as updates are received from the RAQs. Preferably, all the route entries received in an update are inserted in the RAD, although fewer than all may be inserted in alternate embodiments. If the route entry is already present, the router that originated the update through which the route entry was learned, or which in general becomes known as being associated with the route entry, is added to the set of routers with which the route entry is associated. If the route entry is not yet present in the tree, a new entry is created in the tree, and the set of routers with which the route entry is associated is initialized with the corresponding router. In the case of the receipt of updates that correspond to the withdrawal of a route entry, the inverse process is followed, i.e., the tree is searched for the route entries that are to be withdrawn and the router that issued the withdrawal is removed from the list of routers associated with the route entry. In case the router was the only one associated with the route entry, the entry is either deleted or marked as inactive. The inactive marking is useful when it is likely that the route entry will be added again in the near future.

Figure 14:
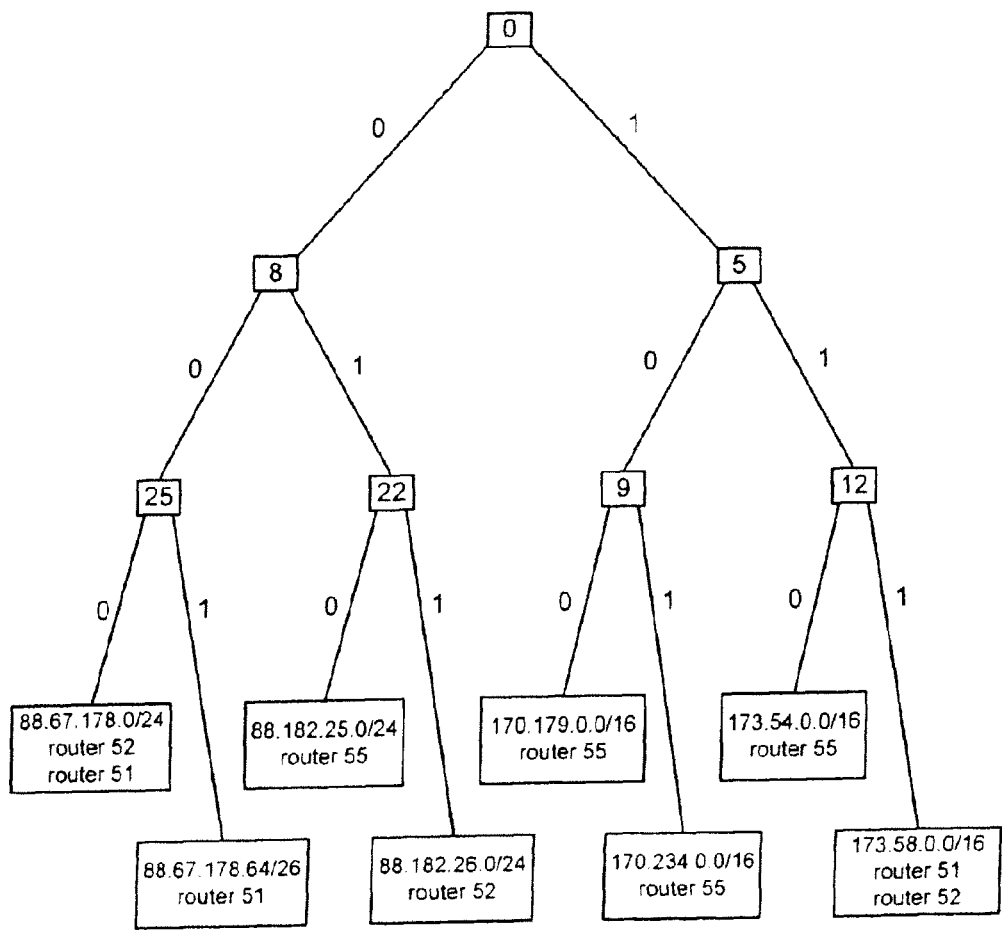
FIG. 14 illustrates a preferred data structure of route association data received from multiple areas of an autonomous system in accordance with the present invention.

FIG. 14 illustrates the structure of a RAD implemented using a Patricia Trie. The structure includes the routing entries that are known for an area, as well as the routers that are known to be associated with (i.e., capable of reaching) each routing entry. Route entries are stored at the leaves of the Trie and include the list of routers associated with them. The nodes of the Trie illustrate exemplary bit positions. For example, FIG. 14 illustrates an example where route entry 173.58.0.0/16 is advertised in the area by both routers 51 and 52 (of FIG. 13), and as a result the identity of the two routers is included in the entry kept for 173.58.0.0/16.

Figure 15:
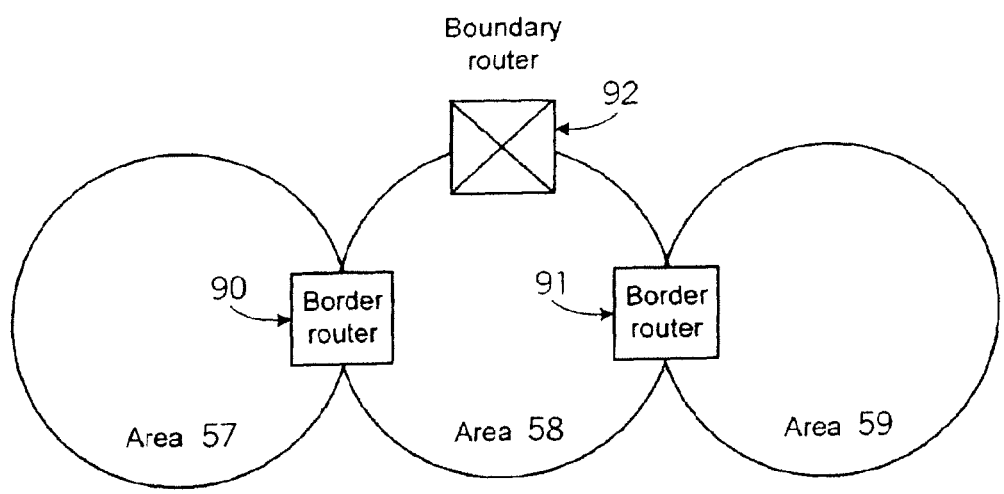
FIG. 15 is an example of an area-level map showing known boundary routers and known border routers for an autonomous system or routing domain.

The RAG module also keeps a data structure, a topology map that provides information needed to determine how the different areas are connected to each other, and for identifying routers that provide connectivity to outer routing domains. This information is readily obtained by identifying routers that advertise the ability of reaching routes in other areas or outside of the network. Based on that information, the RAG constructs an "area-level" map of its routing domain, which is a high-level map showing only routers connecting areas or connecting to other routing domains. An example of such a map is shown in FIG. 15.

The combination of area-level topology and per area detailed topology maps provides the RAG with complete knowledge for determining the set of (shortest) paths actually followed by packets when crossing the routing domain. In addition to maintaining such knowledge for the current state of the network, the RAG also keeps track of past routing states so as to be able to respond to path queries that pertain to time instants in the past. As mentioned earlier, this information is kept in a portion of memory referred to herein as the RAG Historical Information Structure (HIS).

Historical information is useful to support "playback" queries used to identify how paths evolved in response to past changes in the network routing state. The information maintained for this purpose consists of a Raw Advertisements Table (RAT) that includes all updates gathered by the RAG from the RAQs, as well as a Context Access Tree (CAT) that organizes a combination of contexts and updates into a tree structure for easy recovery of past network dynamics. The RAT is a fairly simple structure that keeps a list of events received from various RAQs. It organizes updates based on the time received, the RAQ and area from which the message originated, the network node that originated the advertisement, as well as the raw update itself. An exemplary RAT is illustrated in text form in FIG. 16.

Figure 17:
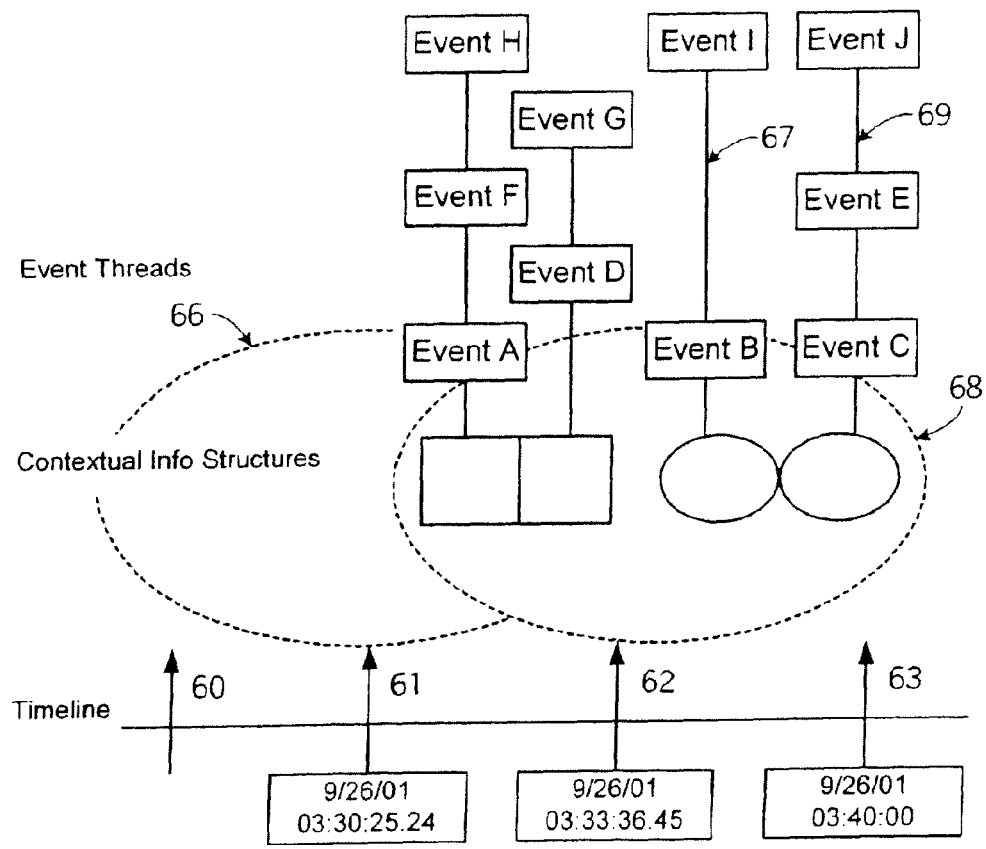
FIG. 17 illustrates a preferred embodiment of a structure of a context access tree that illustrates the format of the data structures used to capture the evolution of the network state over time.

In contrast, the CAT is a more complicated structure. An exemplary CAT is illustrated in FIG. 17. As shown in FIG. 17, the CAT comprises a timeline with various nodes 60, 61, 62, and 63, each of which contains a contextual information structure (CIS) such as 66 and 68 corresponding to a snapshot of the network at a point in time. Linked to each component of the CIS (each area data structure and its RAD) is a time-ordered lined-list of events such as 67 and 69, each of which corresponds to an update that caused a change in the state of the component. This hybrid structure, i.e., the combination of raw information and complete routing state as maintained in the CISs at different time-instances, provides an efficient trade-off between minimizing the amount of information that needs to be stored and allowing for the rapid reconstruction of the CIS associated with any given time instant in the past.

By storing this information in the HIS, the RAG is able to answer queries that pertain to any given routing state, both present and past. The initiation of queries is performed through the RQ module described below, which is responsible for accessing the different data structures maintained by the RAG.

The RQ module is responsible for returning a complete, end-to-end path, or set of such paths, in response to a route query specifying a starting point or origin in the routing domain and a destination address, possibly located outside of the routing domain. The RQ module is capable of answering two different types of route query—instant queries and persistent queries. Instant queries require single-shot responses in the form of a complete, end-to-end path or set of paths. Persistent queries, on the other hand, seek to track the dynamics of a complete, end-to-end path or set of paths over time. There are multiple types of persistent queries based on the conditions under which path dynamics are to be tracked. We distinguish between standard persistent queries, playback persistent queries, and play-forward persistent queries. Additional types of queries are possible, but are not required to practice the present invention.

A standard persistent query is similar to an instant query with the one difference that the query is to be persistently reissued each time a routing update is received (at the RAG) that has the potential to affect the path or set of paths that was previously returned. In other words, a standard persistent query tracks the evolution of a path or set of paths over time, as events, e.g., link or router failures, affect the routing state in the routing domain.

A playback persistent query specifies a starting time in the past and its goal is to track the evolution of a path or set of paths from that point on over a given period of time. In the context of a playback query it is then possible to step through events that have occurred over a period of time in the past, and for each identify which impact, if any, it had on the path or set of paths that were initially in effect.

A play-forward persistent query is similar to a playback query in that it specifies a starting time, possibly in the past, and requires stepping through a set of events in order to identify their impact on the path or set of paths that were initially returned. The main difference between a play-forward query and a playback query is that with a play-forward query, the set of events that are to be used can be specified as part of the query, in order to allow experimenting with different "what if" scenarios and their impact on routing.

Because it only needs to be responsible for retrieving path information from the RAG and possibly updating it in response to routing updates, the structure of the RQ module is optionally and preferably much simpler than that of the other modules. The RQ only needs to maintain path structures that have been returned in response to previous queries, although maintenance of other information is possible but not necessary to practice the present invention. Specifically, for each active query session the RQ keeps both (1) the information that was initially provided when the query was first issued, and (2) all subsequent path structures that were returned in response to the query. In the case of an instant query, this consists of only the origin that was specified for the path, the desired destination address, and the path or set of paths that were returned by the RAG. In the case of a persistent query, the RQ needs to also maintain all intermediate path structures that were returned in response to events that affected the original path structure. The set of events that were considered also needs to be kept.

The operation of the system described in the preferred embodiment may be described in response to five principal triggers: (1) RAQ initialization, (2) RAG initialization, (3)

RQ initialization, (4) Routing update arrival at a RAQ and at the RAG, and (5) Query arrival at the RQ. A description of each event follows:

RAQ initialization: The RAQ initialization has two parts. The first is essentially the initialization phase, such as that which may be followed by a typical router in the routing domain. It consists of a device level initialization followed by a set of procedures aimed at ensuring that all routers in a given area of the routing domain have consistent routing information. In the case of a RAQ that acts as a stub router, this will amount to providing its own routing information to its neighboring router(s) and acquiring its (their) routing information. The second part of the RAQ initialization is concerned with the establishment of a communication channel with a RAG and with the initial exchange of routing information with it. The RAQ first retrieves, e.g., from a configuration file, the address of the RAG with which it needs to communicate and proceeds to initialize their communication channel. Once this step has been carried out, and assuming that the first part of the RAQ initialization has completed, i.e., it has acquired stable routing information, the RAQ initiates the transfer of its topology database and associated data structures to the RAG. The RAQ initialization terminates after this next step.

RAG initialization: The RAG initialization is also carried out in multiple phases. The first phase consists of device initialization and the creation of global data structures associated with the routing domain for which the RAG is responsible. It also includes the initialization of the procedures needed to enable future communications between the RAG and the different RAQs in the routing domain. For example, this can mean listening on a well-known port number or registering for notification of certain event types. Once this first phase has completed, the RAG is ready to receive information from the RAQs and will go through additional initialization procedures each time it discovers a new RAQ. The initialization procedures associated with the discovery of a new RAQ include the creation of the corresponding area data structures described in the description of the RAG above. In other words, the RAG creates a new area structure and also updates its routing domain level structure to reflect the existence of the new area. Information regarding the area's internal topology and overall connectivity in the routing domain is then added as it is received from the RAQ. This second phase completes after the RAQ finishes communicating its initial routing and topology information to the RAG.

RQ initialization: The RQ initialization procedures are optionally and preferably relatively minimal. Preferably, they include little more than contacting the RAG(s) associated with the routing domains the RQ is serving and retrieving from them relevant information that needs to be made available through the RQ User Interface. The identification of the relevant RAG(s) is typically provided through local configuration.

Routing Update: Routing (and topology) updates are transmitted by the RAQs to the RAG and are responsible for ensuring that the RAG maintains accurate information regarding the routing state of its routing domain. A RAQ determines that it needs to forward a routing update to the RAG whenever it itself receives an update (internal or external) that results in the modification of its own topology database. The resulting change must then be communicated to the RAG, which triggers the generation of a routing update by the RAQ. Upon receipt of the routing update, the RAG first identifies the area with which it is associated. This information is available through association with the identity of the RAQ that transmitted the update. Once the relevant area has been identified, the RAG accesses the corresponding CIS and proceeds to modify it in order to reflect the changes advertised in the routing update.

The nature of the changes required depends on the nature of the routing update. For example, the changes may range from the modification of an existing data structure or field, to the deletion of an existing data structure, to the creation of a new data structure. For example, a routing update that advertises a new cost for a link will result in the corresponding value being modified in the ADS. A routing update associated with the deletion or failure of a link or a router will result in the removal of the corresponding data structures of fields in the ADS. Conversely, a routing update associated with the introduction of a new link or a router will result in the creation of data structures necessary to represent those new entities in the ADS. Furthermore, in both cases, the RAD will also be correspondingly modified. In the case of a link or interface failure, it may be necessary to remove the attached router from the list of routers through which any associated route entry is reachable. For example, a router that loses connectivity to a given subnet must be removed from the list of routers associated with the route entry corresponding to the subnet, and if the router was the last one in the list, the route entry needs to be marked as unreachable or deleted. The case of a router failure is similar even if it typically requires more changes.

In addition to triggering potential modifications to the current CIS maintained by the RAG, the receipt of a routing update also affects the HIS at the RAG. Specifically, any received routing update should be added to one of the link lists of events maintained for the last CIS stored in the CAT, as well as to the RAT that keeps track of all the routing events received by the RAG. Finally, the receipt of a routing event can also trigger the storage of a new CIS in the CAT. Specifically, CISs may be stored in the CAT at regular time intervals, or after a given number of routing updates have been received, or according to some combination of those two criteria. In particular, imposing an upper bound on the number of routing updates that can be linked to a given CIS stored in the CAT is desirable to ensure that the CIS associated with an arbitrary time instant can be reconstructed within a reasonable amount of event processing.

Query Processing: The operation of the RQ module on the arrival of a query can be decomposed into a query initialization phase followed by a set of area specific steps and cross-area steps and is described in FIG. 18 in a flowchart format. The query initialization phase includes the following steps: Step 100: The system Determine if the appropriate CIS exists for handling the query. Step 102: If the appropriate CIS does not exist, the RAG creates it. Step 104: The RQ module identifies the source area associated with the starting point or origin of the path. Step 106: The RQ module identifies the origin router associated with the starting or entry point of the path in the source area. Optionally, more than one entry point may be considered.

Steps 100 and 102 come into play in the context of playback or play-forward queries that may not start from the current CIS, but which require the extraction of a CIS corresponding to the time instant from which the playback or play-forward scenario is to start. Specifically, when a query pertains to a time instant different from the current time, it is necessary to first recreate the routing state of the routing domain at that time instant. Thus, step 102 is accomplished by retrieving the necessary information from the HIS maintained at the RAG. The first step in this process consists of searching the CAT to identify the CIS with the latest time preceding the time instant from which the query is to start. In other words, the CAT is searched until a CIS is found that represents the full state of the routing domain at the latest time instant prior to the query starting time. Once the corresponding CIS has been identified, the list of routing events attached to the CIS is processed until all events anterior to the query starting time have been accounted for. The resulting CIS describes the routing state of the routing domain, as it existed at the specified starting time of the query. For example, when referring to FIG. 17 and assuming a desired query starting time of 03:40:00 on Sep. 26, 2001, the search of the CAT would terminate at the CIS that was stored at 03:33:36.45 on Sep. 26, 2001, as it corresponds to the last CIS stored prior to 03:40:00 on that day. However, this CIS does not represent the correct routing state at the desired query starting time. In order to recreate the CIS in effect at 03:40:00 on Sep. 26, 2001, it is necessary to process all the routing update events that are attached to the CIS stored at 03:33:36.45 on Sep. 26, 2001 and that were received prior to 03:40:00.

Figure 18:
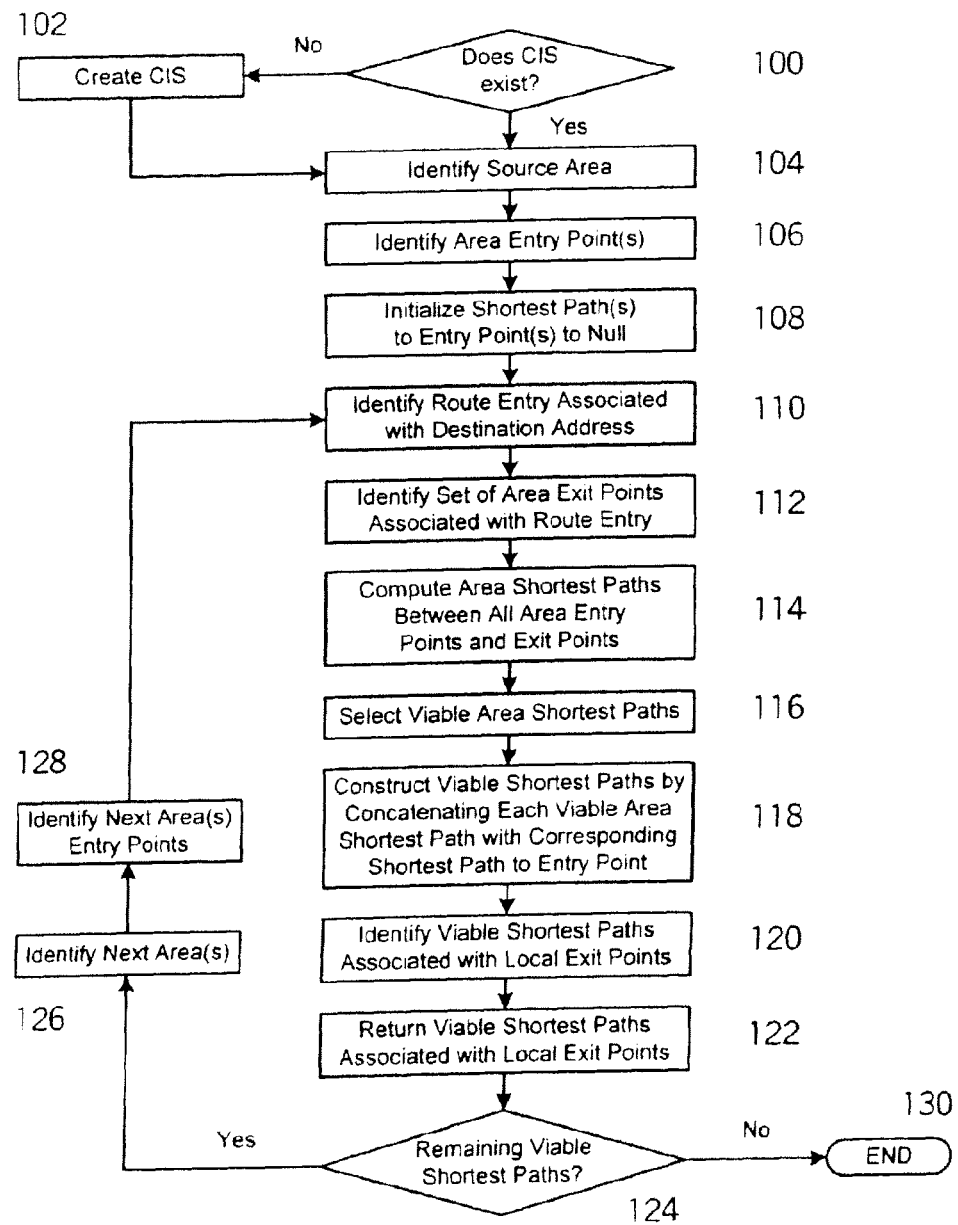
FIG. 18 illustrates, in flowchart form, a preferred embodiment of the method of processing a query for a route identification in accordance with the present invention.
Figure 19:
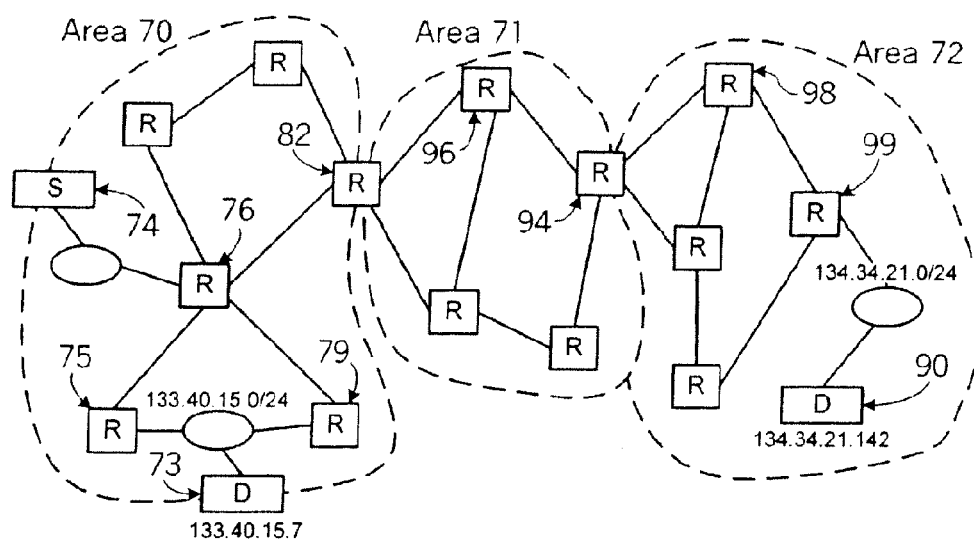
FIG. 19 illustrates an exemplary routing domain containing a starting point, destination addresses, multiple areas, and multiple routers within each area.

Once the appropriate CIS has been retrieved, the next two steps of the initialization performed when a new route query is received are best illustrated by referring to both FIG. 18 and FIG. 19. For this configuration, step 104 of FIG. 18 returns Area 70 of FIG. 19 as the source area for the specified origin point "S" 74, while step 106 of FIG. 18 identifies router 76 (of FIG. 19) as the starting point for paths that are to be returned in response to the route query.

Once the query initialization steps have been performed, referring again to FIG. 18, an area-specific set of steps is initiated and proceeds as follows: Step 108: Optionally and preferably, the shortest path segment from the entry point or points will be initialized to a null value. Step 110: Identify the route entry associated with the specified destination address. Step 112: Identify the exit points in the area that are associated with (i.e., that can reach) the route entry. Step 114: Compute shortest paths between the entry point or points and all exit points identified in step 112. If multiple shortest paths are available, preferably all such shortest paths are identified in this step. If multiple shortest paths have been identified, then the system selects those that are viable for reaching the destination address (step 116).

If previous paths have been calculated (such as those which may exist in other areas), then the system combines those with the paths determined in step 116 (step 118) and identifies the combinations that terminate in the current area and/or are associated with area local exit points (step 120). The system then returns the paths that are complete (step 122) and checks to see if there are other paths (i.e., other areas) that need to be checked (step 124). In cases where the destination address lies either in another area or in another routing domain, additional areas may have to be traversed before a complete set of paths is returned. If there are no other areas, then the path or paths have been identified and the process ends (step 130), typically by returning a report of the shortest path or paths. If another area or areas need to be checked, the system identifies the next area or areas (step 126), identifies the entry point for each such area (step 128), and repeats the process from step 110.

The purpose of steps 110, 112, 114 and 116 is to compute, within a particular area, shortest paths between the specified origin point and all the routers through which the destination could ultimately be reached. Note that when the destination address is associated with a route entry directly reachable from one or more of the routers in the source area, the route query typically terminates at this point. Specifically, when the destination address is associated with an "area-local" route entry, i.e., a route entry associated with a network directly attached to one or more of the area routers, then the RQ determines that all shortest paths between the specified origin and the destination address lie within the area. An exemplary identification of shortest paths within an area can be found in FIG. 19. For example, referring to FIG. 19, if the specified destination address is D1, i.e., 133.40.15.7. In this case, step 114 of FIG. 18 above would return two shortest paths, namely, S-R4-R5-D1 and S-R4-R6-D1. Since address D1 is "local", i.e., both R5 and R6 are connected to subnet 133.40.15.0/24, the query process would stop there and those two paths would be returned.

Referring again to FIG. 19, consider in turn destination address 90 (134.34.21.142) that is associated with a local route entry in area 72, i.e., a different area than that of the origin of the route query (area 70). The Route Query process starts by returning route entry 134.34.21.0/24 as the one associated with the intended destination address 90 and identifies router 82 as being capable of reaching the route entry. Shortest paths are then computed between routers 76 and 82. In this example, a single shortest path (76-82) of distance one (all links are assumed to have unit weight) is returned.

Because destination 90 is not local to area 70, the shortest path 76-82 needs to be extended out of area 70. Note that since it is the only possible shortest path, there is no need to identify which shortest path is to be extended. The next step identifies area 71 as the area in which the shortest path needs to be extended, and router 82 represents the "origin" in area 71 from which the extension needs to be performed. The path extension carried out in area 71 follows the same set of steps as those carried out when computing shortest paths within area 70. It starts with a Route Query that identifies the route entry associated with the destination address 90 134.34.21.142 in area 71. The route query again returns 134.34.2.0/24 and identifies router 94 as being able to reach the destination. The next step consists of computing a shortest path between routers 82 and 94 through area 71. This returns one shortest path 82-96-94 with a distance (in area 71) of two. When concatenated with the initial shortest path segment (76-82) computed in area 70, this returns an extended path segment 76-82-96-94 with a total distance of three. Because destination 90 is still not local to area 71 the path extension process needs to be again repeated for the next area, area 72. This eventually completes by returning the end-to-end path 76-82-96-94-98-99 that has a total distance of five.

Note that the above example only illustrates the general steps of the path computation process as it proceeds through multiple areas, and is not meant as a comprehensive description of all possible scenarios. Configurations involving multiple shortest paths within an area and/or multiple possible exit points from an area will give rise to slightly different intermediate steps that can be identified in reference to FIG. 18.

The previous examples were cast in the context of an "instant query", so that the query processing terminates at that point. On the other hand, if the query is a persistent query, additional processing is required to track path dynamics through the set of events that the persistent query targets. In the case of a standard persistent query, the RQ module registers with the CIS to be notified of routing updates as the RAG receives them. On receiving any such update the RQ module may query the CIS again, if it perceives that a path change is likely. In the case of playback or play-forward persistent queries, the processing of the query continues while stepping through the list of routing updates associated with the query.

In addition to the benefits in monitoring, tracking, and prediction of the path or paths that data make take through a network it is contemplated that route awareness may also benefit the performance, reliability, as well as other characteristics of network communications. In one or more embodiments, route awareness may be used to select a path or paths through which data will be sent. Because the RAQ, RAG, and RQ modules described above allow past, present, and future end-to-end path information to be obtained, one or more paths may be selected based on past, present, or predicted routing behavior of a network.

To illustrate, end-to-end path information may indicate that a packet will take a congested or otherwise undesirable path or segment on the way to its destination. Knowing this, a network device may send the packet along another path even where the other path may have a higher cost. For example, if end-to-end path information indicates that a packet will take an undesirable path or segment to its destination, the packet may be directed through one or more TMP links or one or more TMP links may be created to carry the packet to its destination (such as described above with regard to the auto start/stop feature). The packet may take advantage of TMP's benefits over traditional protocols automatically in this manner. For example, a packet which would be delayed or dropped over a traditional protocol may be reliably sent and/or accelerated with TMP.

A segment of a communication link may be deemed undesirable for a variety of reasons. It will be understood that though referred to by the term segment, the following will apply to determining the undesirability of an end-to-end path or various portions thereof. To illustrate, a segment may be deemed undesirable where it is physically or theoretically incapable of providing the network performance. For example, a segment may be incapable of supporting the desired bandwidth or latency due to its physical makeup or configuration.

A segment may be undesirable due to network conditions. For example, the segment may be undesirable because it is congested or damaged. A segment may also be undesirable because it is not well suited for a particular type of data traffic. For example, the segment may provide high bandwidth but at a high latency which is not well suited for communications requiring low latency but well suited for data transfers.

Figure 24:
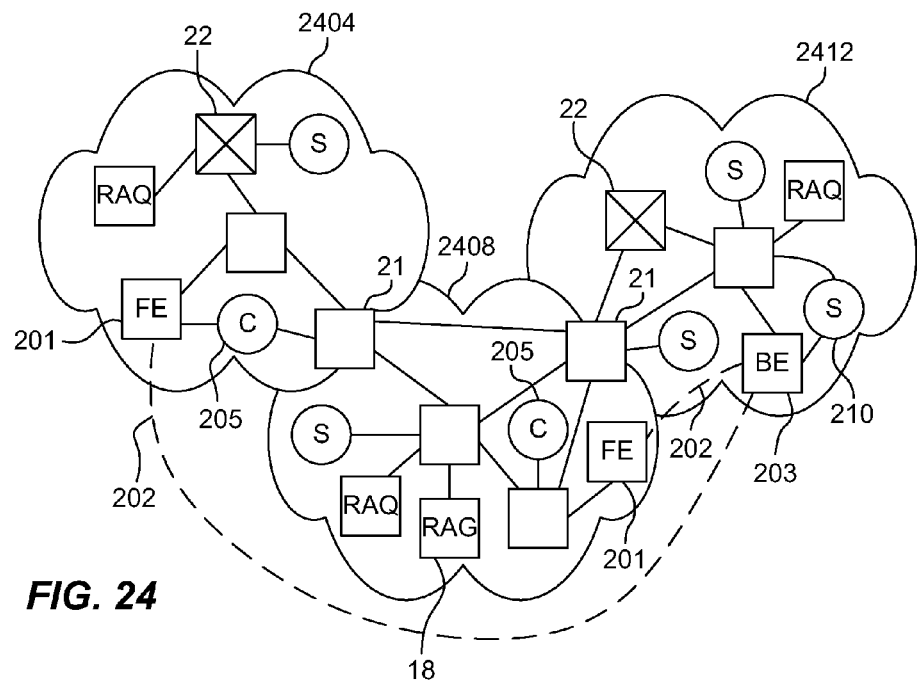
FIG. 24 illustrates an exemplary daisy chain implemented in an exemplary routing domain.

Use of route awareness in transporting data through a network will now be described with regard to FIG. 24. FIG. 24 illustrates an exemplary routing domain having three areas 2404, 2408, and 2412. As can be seen, each area has area routers 20 which route information between routers within an area and border routers 21 which route information between areas. Though not shown, the routing domain may also include one or more boundary routers that serve as entry/exit points to the routing domain.

Area 2404 and area 2408 have a front-end 201 which may be used to establish a TMP link 202 with a back-end 203, such as the back-end in area 2412. Clients 205, directly or indirectly, connected to the front-ends 201 may then communicate with servers 210 connected to the back-end 203 via the TMP links 202. For example, as shown, area 2412 has a server 210 which the front-end 201 may connect to through the back-end 203. The clients 205 may also communicate with the server 210 through the border and area routers 20,21. Thus, as can be seen, there are multiple communication paths between the clients 205 and the server 210.

The multiple paths allow clients 205 a choice of communications paths to communicate with a server 210, and vice versa. The determination of which path to utilize may be made based on a variety of criteria. For example, secure or encrypted traffic may be sent over a TMP link 202 while unsecure traffic is sent through another link, or vice versa. In another example, a server 210 may only be accessible through a private network. In this case, traffic destined for such a server 210 may be sent via one or more TMP links 202 which are in the private network.

In one or more embodiments, route information, such as end-to-end path information may be used as criteria. For example, the client 205, front-end 201, back-end 203, or a combination thereof may request routing information from a RAG module 18. If the routing information indicates that data traffic may take an undesirable path or segment, then data may be sent through one or more alternate paths by the client 205, front-end 201, or back-end 203. In one embodiment, the one or more alternate paths comprise TMP links 202. This is advantageous because TMP is capable of accelerated communications and may have increased reliability over traditional or standard protocols. Thus, for example, a damaged, congested, or slow link may be bypassed by directing traffic through one or more TMP links 202.

In one or more embodiments, the automator described above may be used to direct traffic to a TMP link 202 based on routing information. For example, the automator may be configured to query and/or receive end-to-end path information from the route monitoring system. If the end-to-end path information indicates that an undesirable segment will be used, the automator may start directing traffic through the TMP link 202.

Identification of undesirable segments may occur in various ways. In general, the segments will typically be identified by the route monitoring system such as described above. Individual segments or multiple segments may then be examined to determine their suitability to transport data traffic of various types. For example, RAQ modules may be configured to retrieve configuration information from the routers the modules are in communication with. Other elements of the system herein, such as an automator, front-end, or back-end may also or alternatively be configured to retrieve this information. In this manner, a mapping of the communications capabilities and/or configurations of various segments within a network may be obtained. This segment information may then be recorded or stored on a memory device accessible to an automator. The automator may then retrieve the segment information for one or more segments to determine whether the segment is undesirable. As stated, the automator may take into account the type of traffic being communicated, sources/destinations of the traffic, and other criteria in making this determination.

In one embodiment, the segment information may be stored by a RAG module and provided as the result of a route query. For example, segment information for one or more segments may be provided along with end-to-end path information.

It is contemplated that segment information may also comprise one or more operating characteristics of a segment or segments and that this information may be used to determine undesirability. Operating characteristics of a segment may be measured or otherwise obtained by various network testing devices. For example, a monitor of an automator may be used to measure the operating characteristics. Once obtained, the operating characteristics may be stored as segment information on a memory device, such as described above. The memory device may be a hard drive, optical drive, flash or other memory, or other data storage device locally accessible to the automator. The memory device may also be remotely accessible. For example, the memory device may be a hard drive or other storage on a remote server, RAG module, or other remote device, Referring now to FIG. 24, it is noted that though shown by the dashed lines in FIG. 24 as separate links, the TMP protocol may be used on one or more links of the routing domain. In this manner, one or more TMP links 202 may occur within a routing domain, network, sub-network, or the like. In fact, a TMP link 202 may share the same physical infrastructure as a traditional link. Because of TMP's increased reliability the TMP link 202 may allow traffic to reach its destination where traditional links or protocols would fail. In addition, TMP's increased speed allows traffic to reach its destination at a higher rate on congested links.

The advantages may be seen in a hypothetical network where only one physical path exists between a client and server. Establishing a TMP link across this path provides a client with two communication paths to choose from. If congestion or damage has occurred to the physical path a traditional protocol may fail to reliably or quickly transmit data between the client and the server. Traffic may then be sent through the TMP link which is well suited for this type of situation. When the physical path is repaired or returns to a normal state, traffic may be sent via traditional protocols.

As described herein, the RAG module 18 is capable of providing past, present, and future routing information. Each of these or a combination of these types of routing information may be used to determine whether or not to send traffic through a TMP link 202. For example, if past routing information indicates that a link will be congested at a particular time, traffic may be sent through a TMP link 202 during that time. Likewise, if predicted (i.e. future) information about routes indicates that a link will be congested at a particular time, traffic may be sent through the TMP link 202. In addition, if current routing information indicates one or more damaged, congested, or otherwise undesirable links are in use, traffic may be redirected/sent through the TMP link 202. The benefit of current routing information is that communications may be directed through TMP links 202 in real time. This allows TMP to be used when unpredictable events occur such as an unexpected termination of a link or damage to a link.

In one embodiment, the cost of sending traffic between network devices may be used to determine whether or not the traffic should be sent through a TMP link 202. For example, a cost associated with sending traffic over one or more TMP links 202 may be compared to the cost of sending traffic through other links. Assuming each link is operating normally (e.g. not congested), the least cost link may then be selected to carry the traffic. The determination of the least cost end-to-end path may be made by querying a RAG module for the cost information.

It is contemplated that TMP links 202 may be assigned a low cost to give TMP links preference over other links. For example, the cost of a TMP link 202 may be set to 1 even though there may be one or more hops within the TMP link. In this manner, the TMP link 202 would be more likely to carry traffic than other links even though the other links may actually have less hops than the TMP link.

Route awareness may be used with various types of TMP devices. For example, as discussed above, route awareness may be used to determine whether or not to send traffic through a TMP link 202 between an enhanced client's front-end and a back-end. In addition, route awareness may be used to determine whether or not to send traffic through one or more chaining nodes. In embodiments within chaining nodes, traffic may be routed through a daisy chain, such as described above with respect to FIG. 20. As will now be described, user's can take advantage of the combined benefits of daisy chaining and route awareness in this manner.

Figure 25:
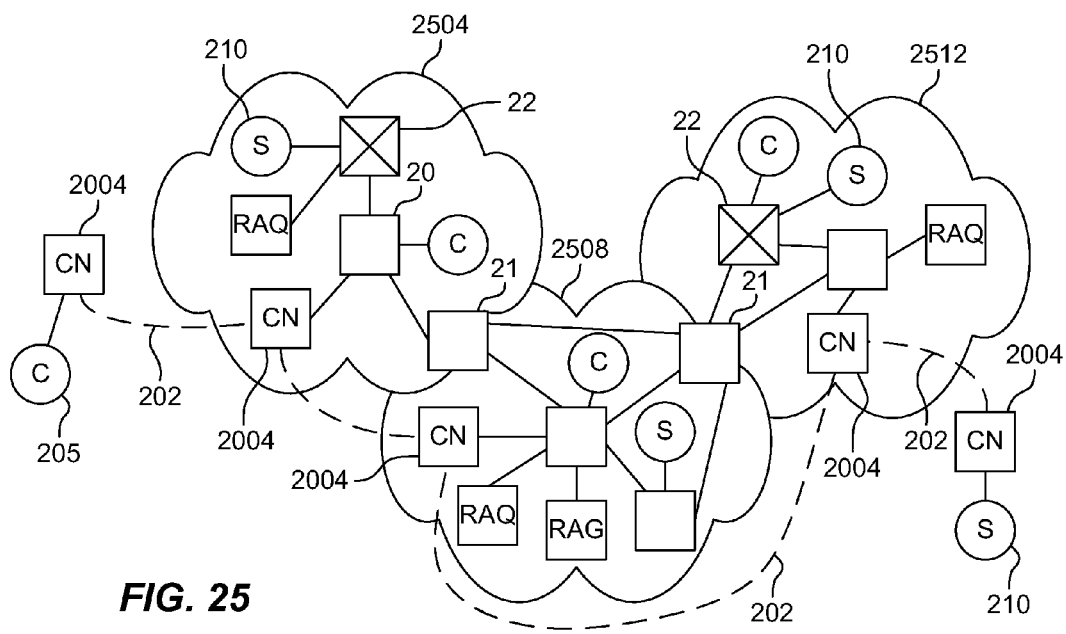
FIG. 25 illustrates an exemplary daisy chain implemented in an exemplary routing domain.

FIG. 25 illustrates an exemplary routing domain having three areas 2504, 2508, 2512. Each area may include one or more chaining nodes 2004. As can be seen, the chaining nodes 2004 may be used to form a daisy chain through the routing domain. At one end of the daisy chain is a chaining node 2004 having a front-end with a client 205 connected thereto, while at the other end of the chain there is a chaining node 2004 having a back-end with a server 210 connected thereto. It is noted that these chaining nodes 2004 may be stand alone front-ends or back-ends in one or more embodiments.

It can be seen that the client 205 at one end of the daisy chain may communicate with the server 210 at the other end of the daisy chain via a plurality of TMP links 202 (or segments) of the daisy chain. It can also be seen that clients 205 and servers 210 in the areas 2504, 2508, 2512 may also communicate through one or more TMP links 202 of the daisy chain. In addition, clients 205 and servers 210 within the areas 2504, 2508, 2512 may communicate with the client and server at the ends of the daisy chain via at least one TMP link of the daisy chain. Of course, clients 205 and servers 210 within the areas 2504, 2508, 2512 also have the option of communicating across other communication links as well, as can be seen in FIG. 25.

The chaining nodes 2004 may function as network junctions as described above. As can be seen, traffic may leave the daisy chain at a chaining node 2004 for a local network (i.e. an area of the routing domain). Likewise traffic may enter the daisy chain from a local network through one of the chaining nodes 2004.

A front-end 201, back-end 203, or chaining node 2004 may request routing information from one or more RAG modules 18. As discussed above, the routing information may be used to determine whether to send traffic through one or more TMP links 202 of the daisy chain to reach a destination device. Of course, traffic may be sent through the one or more TMP links of the daisy chain based on the other criteria discussed herein as well.

For example, if there is congestion, no connectivity, or disruptions in area 2508 and the routing information indicates that traffic would be routed through the area, traffic may be routed through one or more TMP links 202 of a daisy chain to avoid the area. In this manner, traffic that may not have otherwise been successfully communicated, may reach its intended destination and may also be accelerated to the destination. For example, traffic between devices in area 2504 and area 2512 may bypass area 2508 by travelling through one or more TMP links 202. In the routing domain shown, this may occur by the traffic being routed through a pair (or more) chaining nodes 2004. As described above, TMP links 202 that make up segments of a daisy chain may share physical network links with traditional links or protocols. In this manner the TMP links provide an alternate path for data traffic that is capable of increased reliability and speed as compared to traditional protocols.

It is noted that the chaining nodes 2004 may be configured to function as stub routers, area routers, border routers, boundary routers, or a combination thereof in one or more embodiments. As shown for example, the chaining nodes 2004 of the areas 2504, 2508, 2512 may be configured as border routers. Alternatively or in addition, the chaining nodes 2004 may be configured as stub routers.

The chaining nodes 2004 may also perform the function of a RAQ module because, as a stub or other router, the chaining nodes may receive routing events from other routers. The chaining nodes 2004, such as by hardware or software, may be configured to parse, collect, and provide the routing information to a RAG module 18 such as a RAQ module 16 would. In these embodiments, individual RAQ modules 16 may be replaced with chaining nodes 2004 having RAQ hardware or software or otherwise configured to perform the function of a RAQ module 16. Of course, chaining nodes 2004 with RAQ functionality may be used alone or with one or more RAQ modules 16 to provide route awareness in one or more embodiments.

Figure 26:
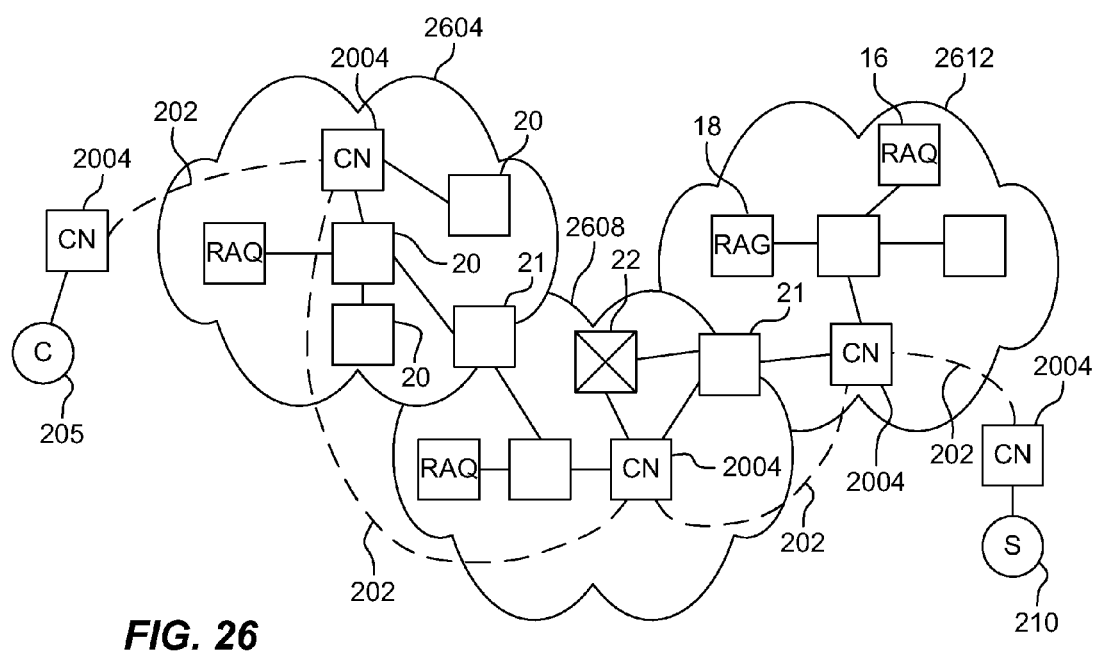
FIG. 26 illustrates an exemplary daisy chain implemented in an exemplary routing domain.

FIG. 26 illustrates and exemplary routing area where the chaining nodes 2004 are configured as area routers. This is advantageous because the chaining nodes 2004 not only provide a TMP link 202 that is part of a daisy chain, but also because, as area routers, the chaining nodes can be configured to determine whether or not to send traffic through a TMP link. For example, in the routing area of FIG. 26, multiple paths exist between area 2604 and area 2608. One of the paths comprises a TMP link 202 between the chaining nodes 2004 of area 2604 and area 2608. Thus, traffic between area 2604 and area 2608 has the option of travelling through a TMP link 202 or via other links. In one or more embodiments, the chaining nodes 2004 may be configured to determine whether or not to send traffic through a TMP link 202 as it travels to its intended destination.

As discussed above, this determination may be based on various criteria. For example, the destination of a packet, the type of packet, or the source of the packet may be used to determine whether to send the packet through a TMP link 202. In one embodiment, the determination may be made based on routing information queried from one or more RAG modules 18. For example, if routing information indicates congestion or other network problems, traffic may be routed through a TMP link 202. As stated above, the routing information may be past, current, or predicted future routing information. The determination may also be made based on one or more operating characteristics or performance characteristics of a route, network, or communication link. The operating or performance characteristics may be provided by an external device or may be monitored such as by an automator of a chaining node 2004, front-end, or back-end. Like the above embodiments, the TMP links 202 of the daisy chain may be on separate physical links or may share one or more physical links with traditional protocols.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for implementing functionality within a network on behalf of first and second devices communicating with each other through the network comprising:
    specifying an ordered list of routing events, wherein the ordered list comprises a list of all routing events received after a routing information context was constructed, wherein the routing information context represents a starting topology and a routing state of a routing domain;
    providing the routing information context;
    constructing path information between a starting address and a destination address within the network using the routing information context;
    updating the routing information context in accordance with a next routing event in the ordered list of routing events;
    repeating the constructing and updating steps above until reaching a last routing event in the ordered list of routing events; and
    based on the path information between the starting address and the destination address, implementing functionality within the network on behalf of the first and second devices to reduce a number of hops between the first and second devices relative to a number of hops in the path information between the starting address and the destination address by:
        providing a front-end device within the network having an interface for communicating data traffic with the first device;
        providing a back-end device within the network having an interface for communicating data traffic with the second device;
        providing a communication channel coupling the front-end device and the back-end device;
        encoding data traffic over the communication channel in a first process in the front-end device;
        encoding data traffic over the communication channel in a second process in the back-end device, decoding the encoded data traffic from the front-end device in a third process in the back-end device; and
        decoding the encoded data traffic from the back-end device in a fourth process in the front-end device, wherein the first, second, third, and fourth processes implement preselected compatible semantics to perform the encoding and the decoding on the data traffic wherein the preselected compatible semantics comprise processes for sharing operational information for the front-end and back-end computers.

2. The method of claim 1, wherein the act of encoding comprises communicating quality of service information about the communication channel between the front-end and back-end devices.

3. The method of claim 1, wherein the act of encoding comprises communicating time-based synchronization information defined by the compatible semantics between the front-end and back-end devices.

4. The method of claim 1, wherein the act of encoding comprises compression/decompression processes defined by the compatible semantics.

5. The method of claim 1, wherein the act of encoding comprises forward error correction processes defined by the compatible semantics.

6. The method of claim 1, wherein the act of encoding comprises communicating time-based synchronization information defined by the preselected compatible semantics between the front-end device and the back-end device.

* * * * *